(12) United States Patent  
Sakamoto et al.

(10) Patent No.: US 8,624,896 B2  
(45) Date of Patent: Jan. 7, 2014

(54) INFORMATION PROCESSING APPARATUS, INFORMATION PROCESSING METHOD AND COMPUTER PROGRAM

(75) Inventors: Junichi Sakamoto, Kanagawa (JP); Masaharu Yoshimori, Tokyo (JP); Tanio Nagasaki, Tokyo (JP); Shinsuke Koyama, Chiba (JP); Kazumasa Ito, Tokyo (JP); Minoru Takahata, Kanagawa (JP); Mikako Hatakenaka, Tokyo (JP); Jin Satoh, Tokyo (JP); Hideshi Yamada, Kanagawa (JP); Kenichiro Yokota, Tokyo (JP); Hideki Takeuchi, Kanagawa (JP); Hitoshi Ishikawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1218 days.

(21) Appl. No.: 12/129,816

(22) Filed: May 30, 2008

(65) Prior Publication Data

US 2008/0301681 A1 Dec. 4, 2008

(30) Foreign Application Priority Data

May 31, 2007 (JP) ................................ P2007-145976

(51) Int. Cl.
*G06T 15/50* (2011.01)
*G06T 15/60* (2006.01)

(52) U.S. Cl.
USPC ............................ 345/426; 345/419; 345/530

(58) Field of Classification Search  
None  
See application file for complete search history.

(56) References Cited

U.S. PATENT DOCUMENTS

2002/0129186 A1* 9/2002 Emerson et al. ............... 710/302  
2006/0100953 A1* 5/2006 Downs ........................... 705/37

FOREIGN PATENT DOCUMENTS

| JP | 5-266201 | 10/1993 |
| JP | 2004-118713 | 4/2004 |
| WO | WO 2007/049610 | 5/2007 |

\* cited by examiner

*Primary Examiner* — Said Broome  
(74) *Attorney, Agent, or Firm* — Frommer Lawrence & Haug LLP; William S. Frommer

(57) ABSTRACT

An information processing apparatus including: a plurality of data processing functional blocks each used for carrying out individual data processing; a flow control section configured to execute control of data flows among the data processing functional blocks; and a control section configured to carry out a setting process to set the data processing functional blocks and the flow control section. The control section acquires configuration information in accordance with a task list for data processing to be carried out; carries out the setting process to set the data processing functional blocks and the flow control section on the basis of the acquired configuration information; and constructs a data processing configuration adapted to various kinds of data processing to be carried out.

23 Claims, 19 Drawing Sheets

INFORMATION PROCESSING APPARATUS, INFORMATION PROCESSING METHOD AND COMPUTER PROGRAM

CROSS REFERENCES TO RELATED APPLICATIONS

The present invention contains subject matter related to Japanese Patent Application JP 2007-145976, filed in the Japan Patent Office on May 31, 2007, the entire contents of which being incorporated herein by reference.

BACKGROUND OF THE INVENTION

1. Field of the Invention

The present invention relates to an information processing apparatus, an information processing method and a computer program. To put it in detail, the present invention relates to an information processing apparatus for carrying out 3-dimensional graphic processing accompanying typically a 3DCG process and/or a CODEC process, relates to an information processing method to be adopted by the information processing apparatus and relates to a computer program implementing the information processing method.

2. Description of the Related Art

A 3DCG (3-Dimensional Computer Graphics) technology plays a role in displaying 3-dimensional data stored in a computer as a display easy to visually understand by carrying out a coordinate transformation process and a shading process on the data. Thus, the 3DCG technology can be used in a wide range of applications such as a video game and a user interface. In addition, the image CODEC processing includes a decompression process to decompress a compressed image stored in a computer and display an image obtained as a result of the decompression process as well as a compression process carried out inversely to the compression process to compress an image. The image CODEC processing is carried out in an apparatus such as a digital video camera, a digital still camera or a hand phone in order to display an image after decompressing the image or store an image in a memory after compressing the image.

In digital apparatus such as a video game, a digital still camera, a digital camera and a hand phone, the 3DCG processing and image CODEC processing are carried out frequently. FIG. 17 is a block diagram showing an example of hardware for carrying out the general 3DCG processing and the general image CODEC processing.

The typical hardware shown in FIG. 17 includes a CPU 11, a DSP 12, a RAM 13, a ROM 14, an external IF 15 and a media processing functional block 20 typically employing a JPEG processing functional block 21, a MPEG processing functional block 22 and a 3DCG processing functional block 23 in the case of the example shown in the figure. The JPEG processing functional block 21 is a section configured to carry out image CODEC processing according to JPEG whereas the MPEG processing functional block 22 is a section configured to carry out image CODEC processing according to MPEG. The 3DCG processing functional block 23 is a section configured to carry out a 3DCG function.

The JPEG processing functional block 21, the MPEG processing functional block 22 and the 3DCG processing functional block 23 each have a processing circuit dedicated to processing unique to the functional block. It is to be noted that the dedicated data processing functional blocks are each also referred to as a functional IP (Intellectual Property).

Instead of making use of such functional IPs (or dedicated data processing functional blocks), there is a technique referred to as a software processing technique by which software is executed by a general-purpose computer having a high processing speed. Since image drawing processing must be generally carried out in a real-time manner, however, the performance of a CPU employed in an ordinary digital apparatus is not high enough for executing the image drawing processing in a real-time manner. For this reason, a dedicated processing circuit is normally used for executing the image drawing processing in a real-time manner. In this case, however, all functional IPs (dedicated data processing functional blocks) must be employed in the dedicated processing circuit, raising a problem of an increased area of an LSI for implementing the functional IPs.

A demand made in past recent years as a demand for a high performance of each IP function is lower than the same demand made presently. Thus, even if a logic circuit was employed for each function in the dedicated processing module, there was no problem. However, there is now a demand for data processing to make the 3DCG technology abundant in image expressions. For example, by carrying out a shading process making use of a program referred to as a shader, it is possible to make the 3DCG technology abundant in image expressions. In a typical shading process adopting a shading technique based on the 3DCG technology, the brightness of each corner point of a plane is computed and the brightness of each point on the plane is then found by linear interpolation based on the computed brightness of each corner point. In addition, the 3DCG technology has been becoming advanced along with the rising demand for performance and functions. As for the image CODEC technology, its algorithm has been becoming complicated and diversified as indicated by the following progression:

MPEG-2→MPEG-4→MPEG-4AVC/H.264

The configurations of the general processes based on the 3DCG and the CODEC technologies are explained by referring to FIGS. 18 and 19 respectively. 3DCG processing is explained by taking an OpenGl process, which is a typical API, as an example. The configuration shown in FIG. 18 as the configuration of the 3DCG processing is introduced in the following document: OpenGL, 2.0 Overview 2003 3Dlabs, Inc.

Vertex information stored in advance in a memory 31 as information on vertices of an object coordinate system is transferred to a vertex processor 32. The vertex processor 32 executes a program prepared in advance in order to carry out vertex processing on the vertex information. As a result of the vertex processing, the vertex processor 32 supplies output vertex information set in a clip coordinate system to a vertex-information processing execution unit 35. The vertex-information processing execution unit 35 outputs its result to a clip/project view cull process 36. The clip/project view cull process 36 is carried out on the result received from the vertex-information processing execution unit 35. The clip/project view cull process 36 outputs its result to a rasterize process 37.

Fragments output by the rasterize process 37 are supplied to a fragment processor 38 for carrying out a fragment process. Besides the fragment process, the fragment processor 38 may also carry out a variety of blend processes by using a texture read out from a texture memory 40. The fragment processor 38 outputs a result of the fragment process to a per fragment operation 39. The result of the per fragment operation 39 is supplied to a frame buffer 41. The result stored in the frame buffer 41 is then is subjected to a 1-frame process, a result of which is finally read out from the frame buffer 41 and displayed. It is to be noted that details of the 3DCG processing are described in a document describing the OpenGL 2.0 standard with a title of "The OpenGL Graphic System: A Specification."

An image CODEC compression process is carried out in accordance with typically an image CODEC processing configuration shown in FIG. 19. An input image is subjected to an intra-frame prediction process. As an alternative, a result of a movement compensation process carried out on different frames is subtracted from the input image to give a difference which is then sequentially subjected to an orthogonal transform process, a quantization process and an entropy encoding process. The output of the quantization process is supplied to an inverse quantization process whereas the output of the inverse quantization process is supplied to an inverse orthogonal transform process. The output of the inverse orthogonal transform process is added to the result of the movement compensation process and the sum is filtered in a loop filtering process. An image frame of the loop filtering process is then stored in a frame memory. The movement compensation process is a movement prediction process carried out on an image stored in the frame memory. In addition, a vector output by the movement prediction process and the output of the intra-frame prediction process are also subjected to the entropy encoding process in the same way as the output of the quantization process. The result of the entropy encoding process is a stream.

CODEC decoding processing is basically process carried out in a sequence inverse to that of the CODEC encoding processing described above. However, the CODEC decoding processing does not include the movement prediction process and the inverse processes (that is, the inverse quantization process and the inverse orthogonal transform process).

As described above, FIG. 18 shows the configuration of the 3DCG processing whereas FIG. 19 shows the configuration of the image CODEC processing. In an ordinary configuration, each of the 3DCG and the image CODEC processing is carried out by an independent functional IP or a data processing functional block. To put it concretely, as described earlier by referring to FIG. 17, the JPEG processing functional block 21 is a section configured to carry out image CODEC processing according to JPEG whereas the MPEG processing functional block 22 is a section configured to carry out image CODEC processing according to MPEG. The 3DCG processing functional block 23 is a section configured to carry out the 3DCG processing.

In the case of the image CODEC processing supporting a plurality of standards, some circuits such as a movement detection circuit and a movement compensation circuit may be shared by the standards as circuits common to the standards. For every one of the standards, however, there are also a number of peculiar circuits. In addition, logic circuits of any other function such as the 3DCG circuit are not circuits that can be shared by the standards. Examples of functional IP (or each dedicated data processing functional block) of the image CODEC processing are the JPEG processing functional block 21 for carrying out image CODEC processing according to JPEG and the MPEG processing functional block 22 for carrying out image CODEC processing according to MPEG as shown in FIG. 17.

If each functional IP (or each dedicated data processing functional block) is employed in accordance with such a technique, the size of the circuit becomes large. In order to meet a demand for a high speed in every process and keep up with an increase of the amount of processed data, a gate is used for every implementing functional IP (or every dedicated data processing functional block) as a logic circuit. In this case, the size of the gate also increases. Thus, the area of an LSI mounted on the digital apparatus increases and, as a result, the manufacturing cost also rises faster. In addition, if the area of an LSI mounted on the digital apparatus put to practical use increases, there is raised a problem that the power consumptions of the LSI and the digital apparatus rise due to leak currents that flow even if a variety of functions are not being carried out.

SUMMARY OF THE INVENTION

In order to solve the problems including those described above, inventors of the invention have proposed an information processing apparatus, an information processing method to be adopted by the apparatus and a computer program implementing the method. The proposed information processing apparatus has a small size as well as a low power consumption and is applicable to various kinds of data processing by implementing:

an extracted portion common to all the kinds of data processing such as the 3DCG processing as the CODE process as fixed logic circuits each having a low power consumption; and portions each peculiar to a kind of data processing as a programmable circuit which is usable as a circuit common to all the kinds of data processing.

According to an embodiment of the present invention, there is provided an information processing apparatus including:

a plurality of data processing functional blocks each used for carrying out an individual data processing;

a flow control section configured to execute control of data flows among the data processing functional blocks; and a control section configured to carry out a setting process to set the data processing functional blocks and the flow control section, wherein the control section:

acquires configuration information in accordance with a task list for data processing to be carried out;

carries out the setting process to set the data processing functional blocks and the flow control section on the basis of the acquired configuration information; and constructs a data processing configuration adapted to various kinds of data processing to be carried out.

According to another embodiment of the present invention, there is provided an information processing apparatus according to claim 1 wherein at least some of the data processing functional blocks are configured to function as data processing functional blocks for carrying out a variety of processes according to a received instruction and configured into a configuration capable of performing different kinds of data processing in conformity with the setting process carried out by the control section.

According to yet another embodiment of the present invention, there is provided an information processing method to be adopted in an information processing apparatus including:

a plurality of data processing functional blocks each used for carrying out an individual data process;

a flow control section configured to execute control of data flows among the data processing functional blocks; and a control section configured to carry out a setting process to set the data processing functional blocks and the flow control section, wherein the control section executes the steps of:

acquiring configuration information in accordance with a task list for data processing to be carried out;

carrying out a setting process to set the data processing functional blocks and the flow control section on the basis of the acquired configuration information; and constructing a data processing configuration adapted to the data processing to be carried out.

According to yet another embodiment of the present invention, there is provided a computer program to be executed to drive an information processing apparatus including:

a plurality of data processing functional blocks each used for carrying out an individual block process;

a flow control section configured to execute control of data flows among the data processing functional blocks; and a control section configured to carry out a process to set the data processing functional blocks and the flow control section, wherein the control section executes the steps of:

acquiring configuration information in accordance with a task list for data processing to be carried out;

carrying out a setting process to set the data processing functional blocks and the flow control section on the basis of the acquired configuration information; and constructing a data processing configuration adapted to the data processing to be carried out.

In accordance with a configuration of an information processing apparatus, the apparatus employs:

a plurality of data processing functional blocks each used for carrying out an individual block process;

a flow control section configured to execute control of data flows among the data processing functional blocks; and a control section configured to carry out a process to set the data processing functional blocks and the flow control section, wherein the control section:

acquires configuration information in accordance with a task list for data processing to be carried out;

carries out a setting process to set the data processing functional blocks and the flow control section on the basis of the acquired configuration information; and constructs a data processing configuration adapted to the data processing to be carried out.

Thus, processing such as the 3DCG processing and the image CODEC processing can be carried out by data processing functional blocks common to different kinds of data processing so that it is possible to provide an information processing apparatus allowing an implementation area of the information processing apparatus to be reduced. In addition, it is possible to decrease the cost of manufacturing the information processing apparatus as well as the power consumption of the apparatus.

BRIEF DESCRIPTION OF THE DRAWINGS

FIG. 2A is a diagram showing a list of tasks;

FIG. 2B is a diagram showing information blocks each related to one of the tasks;

FIG. 2C is a diagram showing different active maps included in each information block;

DETAILED DESCRIPTION OF THE PREFERRED EMBODIMENTS

By referring to diagrams, the following description explains details of an information processing apparatus, details of an information processing method to be adopted by the information processing apparatus and details of a computer program implementing the information processing method.

First of all, an outline of the present invention is explained. The information processing apparatus provided by the present invention employs hardware common to at least some of processes in the 3DCG processing and the image CODEC processing such as processes conforming to standards such as MPEG and JPEG.

The image CODEC processing includes, among other processes, the quantization process, the orthogonal transform process (or the DCT (Discrete Cosine Transformation) process), a movement search process and a movement compensation process. The orthogonal transform process is a process to compress or decompress macro-blocks. For the quantization process and the orthogonal transform process, processing varying from standard to standard is carried out. For the movement search process and the movement compensation process, however, almost the same intra-image search processing and almost the same filtering processing are carried out for different standards which include MPEG and JPEG. In addition, it is desirable to implement the intra-image search processing and the filtering processing by making use of a temporary local image memory area and a filtering processor which are means also usable in 3DCG texture processing. Thus, one data processing functional block can be used to carry out the movement search process, the movement compensation process and the texture process.

In addition, for example, a pixel process of the image CODEC macro-block processing can be best carried out as parallel processing. In this case, typically, a processor capable of carrying out 4 parallel processes on 4 inputs respectively is used to perform the parallel processing. In this way, an increased processing speed due to a $4^{th}$ or $8^{th}$ order of parallelism can be anticipated. In addition, the coordinate transformation of the vertex shader process in the 3DCG processing and the fragment sub-process of the fragment shader process of the 3DCG processing can each be carried out as parallel processing as well. Thus, an increased processing speed due to the $4^{th}$ order of parallelism can be realized.

Figure 18:
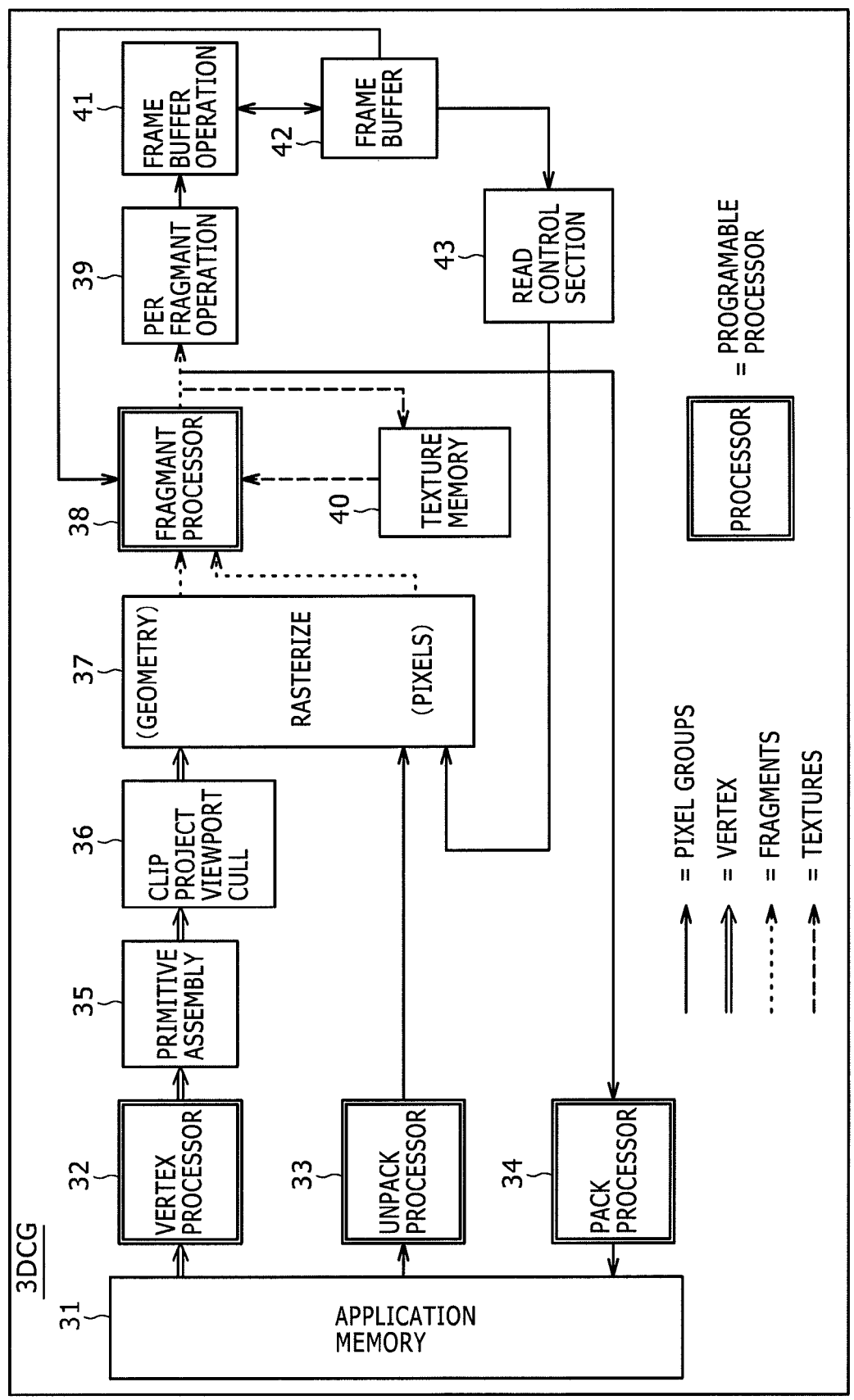
FIG. 18 is a block diagram showing an example of hardware for carrying out the general 3DCG processing.
Figure 19:
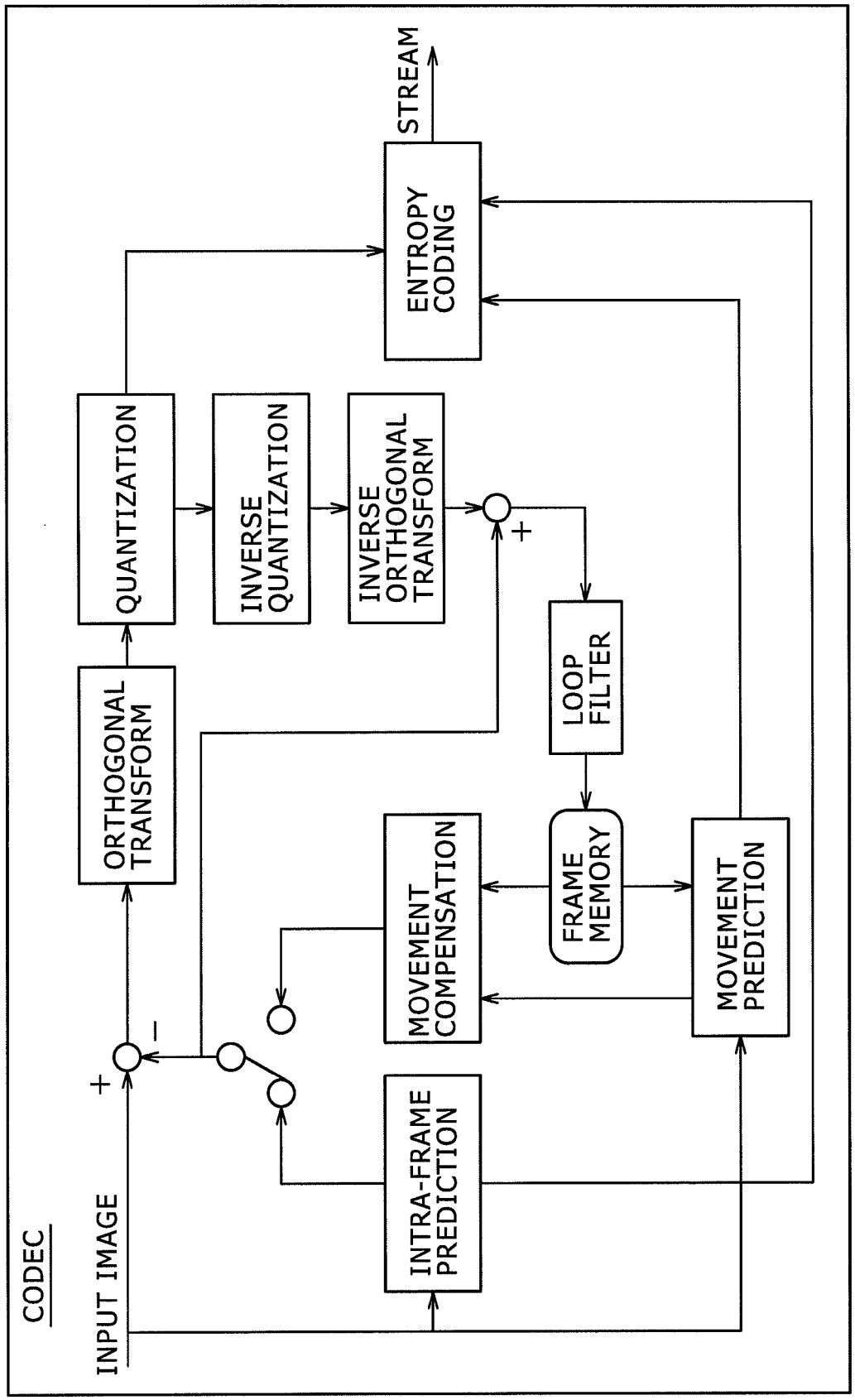
FIG. 19 is a block diagram showing an example of hardware for carrying out the general CODEC processing.

In the case of the 3DCG processing for example, as explained earlier by referring to FIG. 18, processes such as the vertex process and the fragment process are carried out. In the vertex shader process carried out as the vertex process, the coordinates of (x, y, z, w) of a vertex are taken as data being processed and data processing is carried out in accordance with the following equation:

$$(x',y',z',w) = \text{ModelView \& Projection matrix} * (x,y,z,w)$$

In the fragment shader process, on the other hand, values (r, g, b, a) are taken as data being processed and data processing is carried out in accordance with the following equation:

$$(r,g,b,a) = (r1,g1,b1,a1) + (r2,g2,b2,a2)$$

where (r, g, b, a) is red, green and blue color values of a pixel and an alpha value thereof.

In the case of the image CODEC processing, on the other hand, a 1-dimensional integer DCT process conforming to the MPEG-4AVC/H.264 standard is typically carried out. In this DCT process, DCT transformation is applied to an input (a0, a1, a2, a3) serving as the subject of transformation in accordance with the following equation:

$$(A0,A1,A2,A3) = \text{Transformation matrix} * (a0,a1,a2,a3).$$

As described above, all the pieces of data processing are carried out on the basis of similar computations.

It is to be noted that processes of the image CODEC processing are carried out in a way varying among a variety of CODEC standards such as JPEG, MPEG-2, MPEG-4 and MPEG-4AVC/H.264. The processes of the image CODEC processing are the macro-block orthogonal transform process and the quantization process (or the inverse macro-block orthogonal transform process and the inverse quantization process) as well as the intra-block filtering process. In addition, processes of the 3DGC processing are required to be processes that can be programmed freely by the user which is a programmer or a designer. The processes of the 3DGC processing are the vertex shader program and the fragment shader program. It is thus desirable to have these processes as processor processing executable by making use of a variety of programs. In the configuration of the present invention, these processes are implemented as a data processing functional block provided with a processing execution section configured to carry out parallel processing.

It is to be noted that, even if the data processing functional block usable as a block common to the 3DCG processing and the image CODEC processing has been set, it is still necessary to implement a variety of processes along data processing sequences. For example, in the case of the 3DGC processing, processes are carried out along the following data processing sequence:

Memory→Vertex shader process→Rasterize process→Fragment shader process→Per fragment operation→Memory As described above, the vertex shader process and the fragment shader process in the above data processing sequence are each required to be a process carried out by execution of a program. Since the vertex shader process and the fragment shader process are set before and after the rasterize process, a data transfer is required as follows. A data processing section executing a program of the vertex shader process carries out the vertex shader process and outputs the result of the execution of the vertex shader process to the rasterize process. Then, the result of the rasterize process is supplied back to the same data processing section executing a program of the fragment shader process. This time, the data processing section carries out the fragment shader process.

In the case of the image CODEC processing, on the other hand, processes are carried out along the following data processing sequence:

Memory→Entropy decoding process→Inverse quantization process→Inverse orthogonal transform process→Block integration process→Memory The inverse quantization process and the inverse orthogonal transform process in the above data processing sequence can each be properly carried out by execution of a program. Since the inverse quantization process and the inverse orthogonal transform process are carried out successively in the above data processing sequence, however, a data processing section configured to execute the program is capable of carrying out these processes as a sequence of processes without the need to supply data to an external recipient and receive data from an external source.

Thus, it is possible to provide a configuration employing a data processing section (IP: functional bloc) configured to carry out the vertex shader process and fragment shader process of the 3DCG processing as well as the inverse quantization process and inverse orthogonal transform process of the image CODEC processing. If the hardware of the configuration is designed as hardware oriented for a specific process only, however, the configuration will have a problem that the hardware cannot be used to carry out processes other than the specific one.

The information processing apparatus according to the embodiment of the present invention is provided with hardware capable of carrying out various kinds of data processing like the ones described above. That is to say, the information processing apparatus has hardware common to all the kinds of data processing. In addition, the information processing apparatus has a data processing section capable of carrying out a variety of data processing sequences by execution of programs each provided for a process.

A concrete embodiment implementing the information processing apparatus according to the present invention is explained as follows. The embodiment explained in the following description implements an information processing apparatus having a data processing section capable of carrying out an image drawing process of the 3DCG processing and the image CODEC process.

Figure 1:
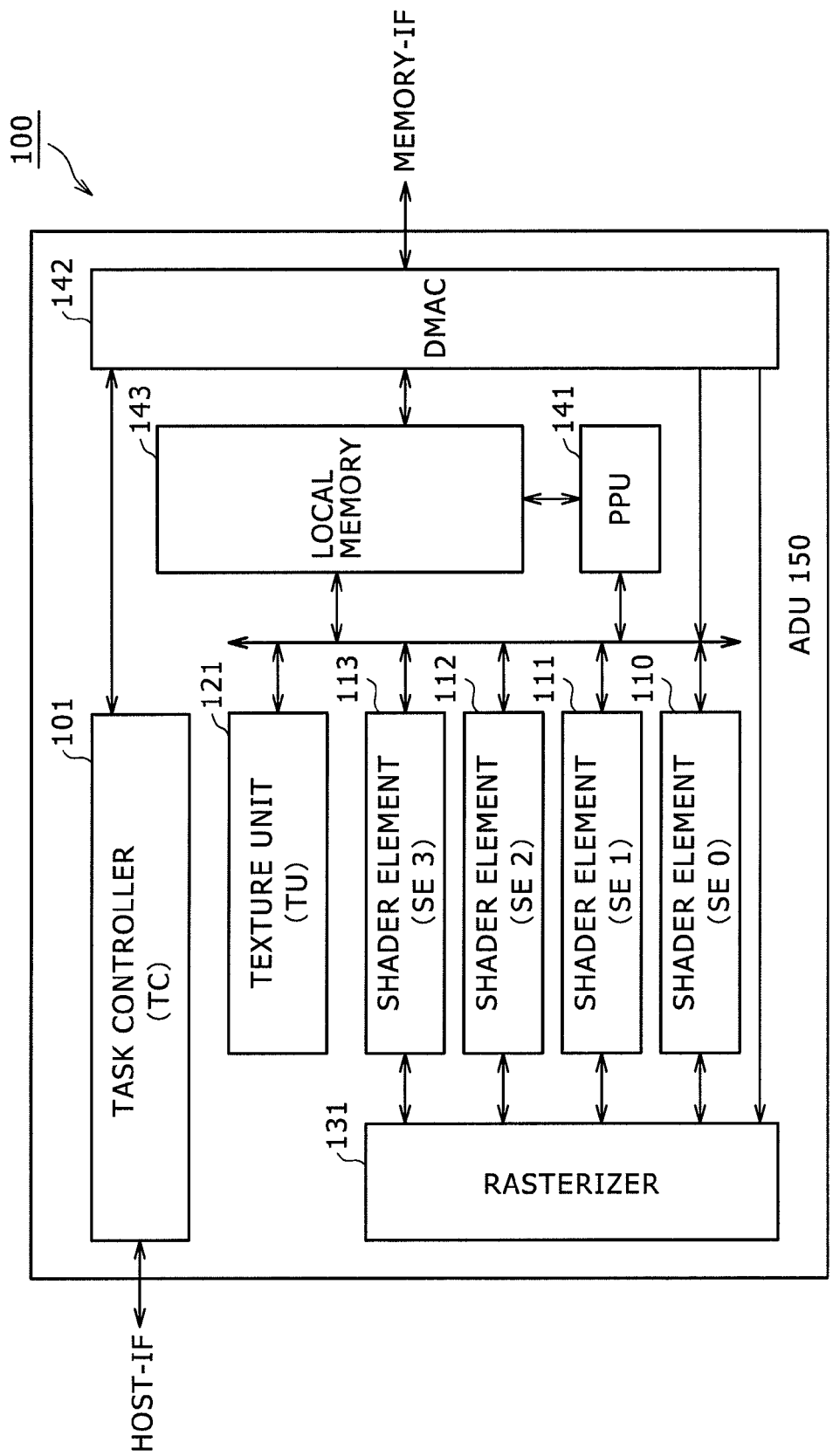
FIG. 1 is a block diagram showing a data processing section employed in an information processing apparatus according to the embodiment of the present invention.

FIG. 1 is a block diagram showing a data processing section 100 employed in an information processing apparatus according to the embodiment of the present invention. The data processing section 100 is typically designed as an LSI having a plurality of data processing functional blocks each used for carrying out individual data processing. In the case of the embodiment shown in the figure, the data processing functional blocks are enumerated as follows: SE 0 to the SE 3 (the shader elements 110 to 113), a rasterizer 131, a PPU (pixel processing unit) 141 and a TU (texture unit) 121. In addition, the data processing section 100 also employs an ADU (arbitration distribution unit) 150 and a TC (Task Controller) 101. The ADU (arbitration distribution unit) 150 is a flow control section configured to execute control of data flows among the data processing functional blocks. The TC (task controller) 101 is a control section configured to carry out a setting process to set the data processing functional blocks and the ADU (arbitration distribution unit) 150. The TC (task controller) 101 functioning as a control section in the data processing section 100 acquires configuration information in accordance with a task list for data processing to be carried out, carries out a setting process to set the data processing functional blocks as well as the ADU (arbitration distribution unit) 150 serving as the flow control section on the basis of the acquired configuration information and constructs a data processing configuration adapted to the data processing to be carried out.

It is to be noted that, even though the flow control section (that is, the ADU (arbitration distribution unit) 150) is not shown as a block in FIG. 1, the ADU (arbitration distribution unit) 150 is a unit for executing control of data flows among the data processing functional blocks. The data flow control executed by the ADU (arbitration distribution unit) 150 will be explained later.

As described above, the data processing section 100 employs the TC (task controller) 101. The TC (task controller) 101 has the function of a host interface. To put it concretely, the TC (task controller) 101 receives a command as a task list from an upper-level host CPU executing software of applications and libraries. The task list is interpreted as the substance of processing including requests each made for an access to a register. The TC (task controller) 101 then activates the entire data processing section 100 and carries out a process to synchronize the internal elements of the data processing section 100. In addition, the TC (task controller) 101 also carries out the entropy encoding and decoding processes of the image CODEC processing.

The shader elements 110 to 113 each referred to hereafter simply as an SE each carry out the following processes and operations:

(a): a vertex element operation of the vertex shader process in the 3DCG processing;

(b): a fragment element operation of the fragment shader process in the 3DCG processing; and (c): the macro-block quantization and inverse quantization processes, the orthogonal transform and inverse orthogonal transform processes, an intra prediction compensation process, a block integration process and an in-loop filtering process in the image CODEC processing.

In the case of this embodiment, the operations (a) and (b) as well as the processes (c) are carried out as SIMD parallel processing by execution of programs.

The embodiment shown in the figure employs four SEs (shader elements). It is to be noted, however, that the shader-element count of four is typical. That is to say, the number of shader elements can be set at any value according to a desired number of parallel processes. For example, the number of shader elements can be set at any value up to 256.

The TU (Texture Unit) 121 carries out the following processes:

(a): Processes of the 3DCG processing. These processes include sampling of a texture mapping process, texture point sampling which is a filtering function, a bilinear filtering process, a tri-linear filtering process, anisotropic filtering process, a cubemap process and a MIPMAP image generation process.

(b): Processes of the image CODEC processing. These processes include a movement compensation process and a movement detection process.

In the 3DCG processing, the rasterizer 131 carries out a view port transformation process, a perspective division process, a clipping process, a triangle setup process, a point sprite extension process, a pixel interpolation process, a multi-sampling process, a scissoring process, a polygon offset process, a depth range process and a face culling process. These processes are referred to as a rasterize process.

The PPU (Pixel Processing Unit) 141 has a function to carry out a per fragment operation in the 3DCG processing and a pixel read/write function.

The data processing section 100 also employs a DMAC (direct memory access controller) 142 having a function for interfacing with an external memory provided externally to the data processing section 100. To be more specific, the DMAC (direct memory access controller) 142 is a section configured to control a DMA (direct memory access) transfer of receiving data from the external memory and storing the transferred data into a local memory 143.

The local memory 143 is a memory for storing data transferred from the external memory and temporarily storing data being processed internally in the data processing section 100.

It is to be noted that the data processing section 100 carries out the vertex shader process and the fragment shader process in the 3DCG processing as well as the quantization process (or the inverse quantization process) and the orthogonal transform process (or the inverse orthogonal transform process) in the CODEC processing. It is thus necessary to carry out operations to transfer data output by these processes among configuration elements employed in the data processing section 100 and operations to supply data to the processes in different ways.

In order to change the data transferring or supplying way in accordance with the type of the process, it needs to provide the data processing section 100 with the ADU (arbitration distribution unit) 150 which is shown as a direct link or a bus in the figure. In actuality, the ADU (arbitration distribution unit) 150 employs a data buffer and/or a cross switch.

An outline of processing carried out by the data processing section 100 shown in the figure is explained as follows.

First of all, typical operations in typical 3DCG processing are explained. A task list transmitted by an upper-level host CPU outside the data processing section 100 to the data processing section 100 by way of a host IF is stored in the TC (task controller) 101. A task in the task list is then activated by execution of a register write process. The TC (task controller)

101 gives a DMA transfer command to the DMAC (direct memory access controller) 142 in accordance with the task list.

Figure 2:
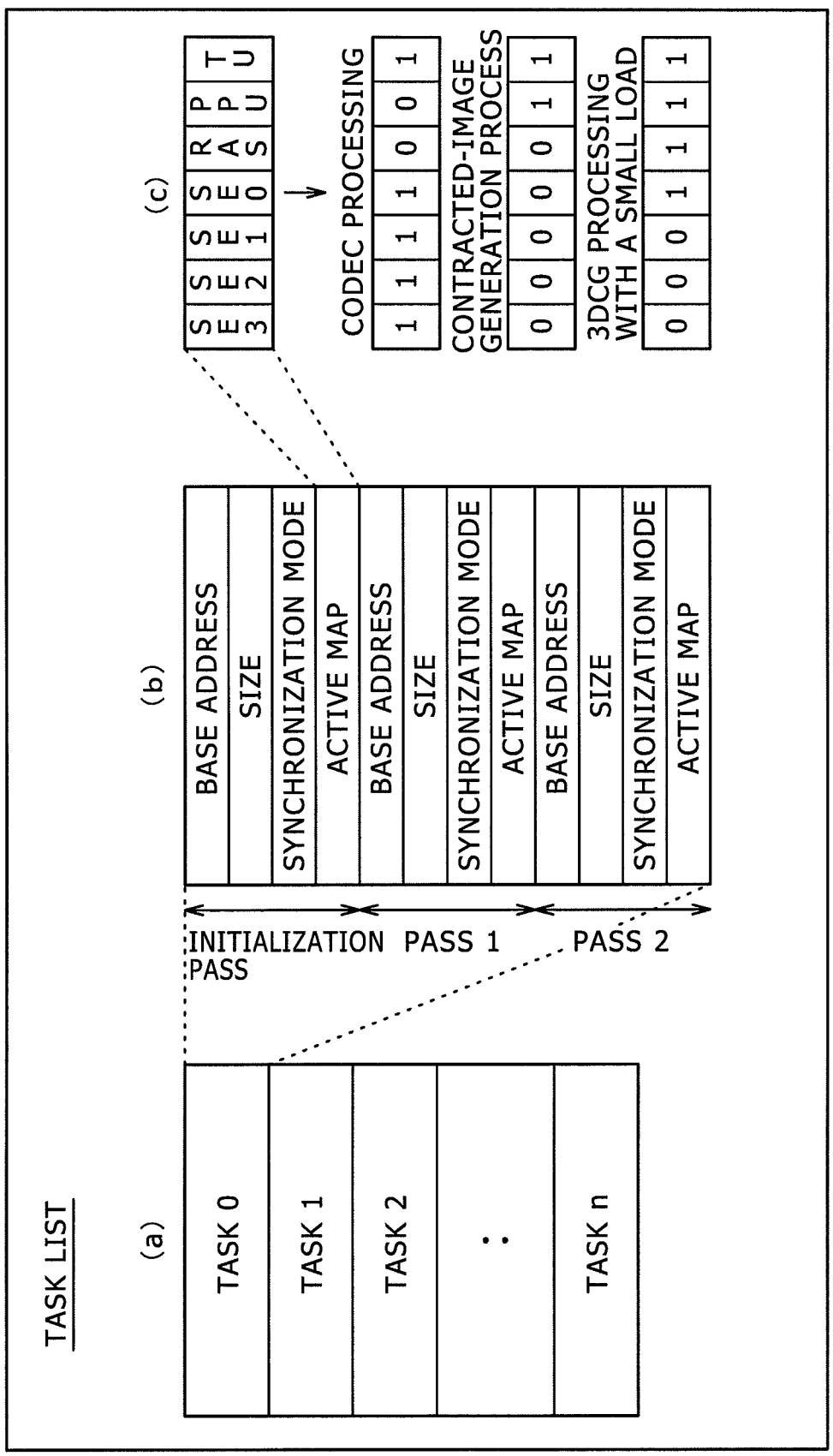
FIG. 2 is a plurality of diagrams showing a typical task list used in the information processing apparatus according to the embodiment of the present invention.

FIG. 2 is a plurality of diagrams showing a typical task list used in the embodiment. As shown in FIG. 2A, the task list includes a plurality of tasks each used as a processing unit. As shown in FIG. 2B, a task has a plurality of passes each used as a DMA transfer unit. Each of the passes prescribes the base address of data to be transferred from the external memory, the size of the data, a synchronization mode and an active map. The tasks each including such passes are arranged on the task list in a task-execution order. In the case of the typical task list shown in the figure, the tasks are carried out as follows:

task 0→task 1→task 2 . . . task n

In each of the tasks, passes of the task are executed in the following order:

initialization pass→pass 1→pass 2

The base address of data to be transferred from the external memory and the size of the data are information used for carrying out a DMA transfer. That is to say, in accordance with control executed by the DMAC (direct memory access controller) 142 on the basis of the information, the DMA transfer is carried out. The synchronization mode prescribes a timing to start a DMA transfer between passes. The active map prescribes data processing functional blocks to be activated as blocks each required in the pass to be executed.

As shown in FIG. 2C, the active map is a plurality of flags each indicating whether or not a data processing functional block represented by the flag is to be activated for executing data processing. The data processing functional blocks each represented by a flag are those shown in FIG. 1. That is to say, the data processing functional block represented by the flags are the SE 0 to the SE 3 (the shader elements 110 to 113), the rasterizer 131, the PPU (pixel processing unit) 141 and the TU (texture unit) 121. Typically, a flag set at 1 indicates an active data processing functional block. That is to say, a flag set at 1 indicates that the data processing functional block represented by the flag is used in the processing. On the other hand, a flag set at 0 indicates an inactive data processing functional block. That is to say, a flag set at 0 indicates that the data processing functional block represented by the flag is not used in the processing.

The typical active map shown in FIG. 2C indicates that, the SE 0 to the SE 3 (the shader elements 110 to 113) and the TU (texture unit) 121 are used as a processing configuration in the image CODEC processing, the PPU (pixel processing unit) 141 and the TU (texture unit) 121 are used as a processing configuration in contracted-image generation processing whereas the shader element (SE 3) 113, the rasterizer 131, the PPU (pixel processing unit) 141 and the TU (texture unit) 121 are used as a processing configuration in the 3DCG processing with a small load.

It is to be noted that a process carried out by a shader element varies in accordance with the processing to which the process pertains. For example, in the 3DCG processing, the control section sets the shader elements to carry out the vertex shader process and the fragment shader process. In the image CODEC processing, on the other hand, the control section sets the shader elements to carry out the macro-block process.

Figure 3:
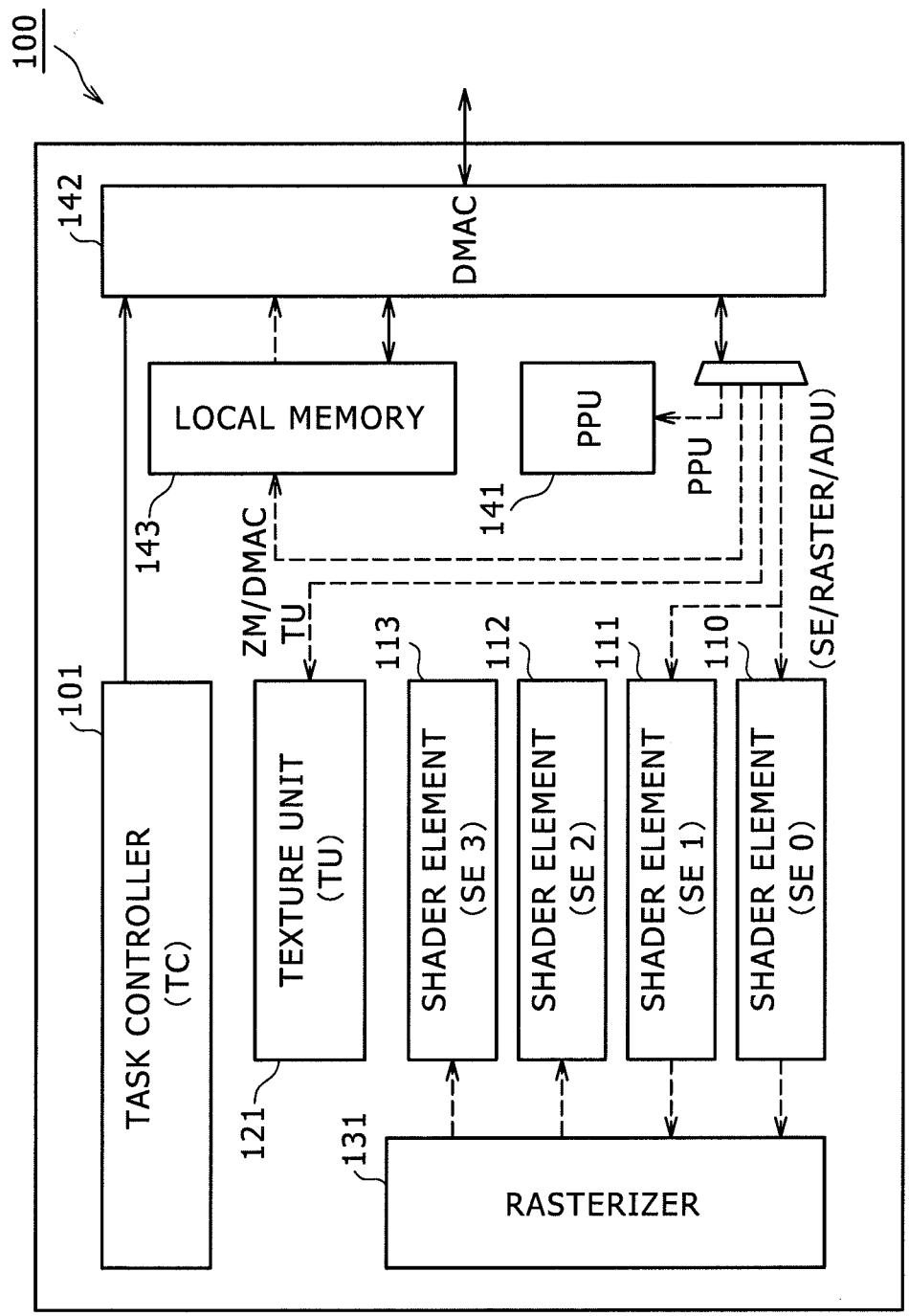
FIG. 3 is an explanatory diagram to be referred to in description of a process to set configuration information in the information processing apparatus according to the embodiment of the present invention.

The TC (task controller) 101 functioning as the control section carries out a setting process according to data processing to be performed in the initialization pass of a task on the task list shown in FIG. 2. That is to say, the TC (task controller) 101 carries out an initial setting process required as a process common to the passes in the task. A plurality of the data processing functional blocks employed in the data processing section 100 shown in FIG. 1 each have a setting register referred to hereafter as a configuration register. For example, the rasterizer 131 has a configuration register called RA_PRIM. The RA_PRIM configuration register is a register for prescribing the type of a primitive used in a drawing process in the 3DCG processing. Such configuration registers are set as follows. As shown in FIG. 3, the DMAC (direct memory access controller) 142 transfers setting data also referred to as configuration information from the external memory to the inside of the data processing section 100. The setting data is then distributed to configuration registers each included in a data processing functional block indicated by a register address through the ADU (arbitration distribution unit) 150. Dashed-line arrows shown in FIG. 3 each represent a path of the setting data transferred to a configuration register.

Figure 4:
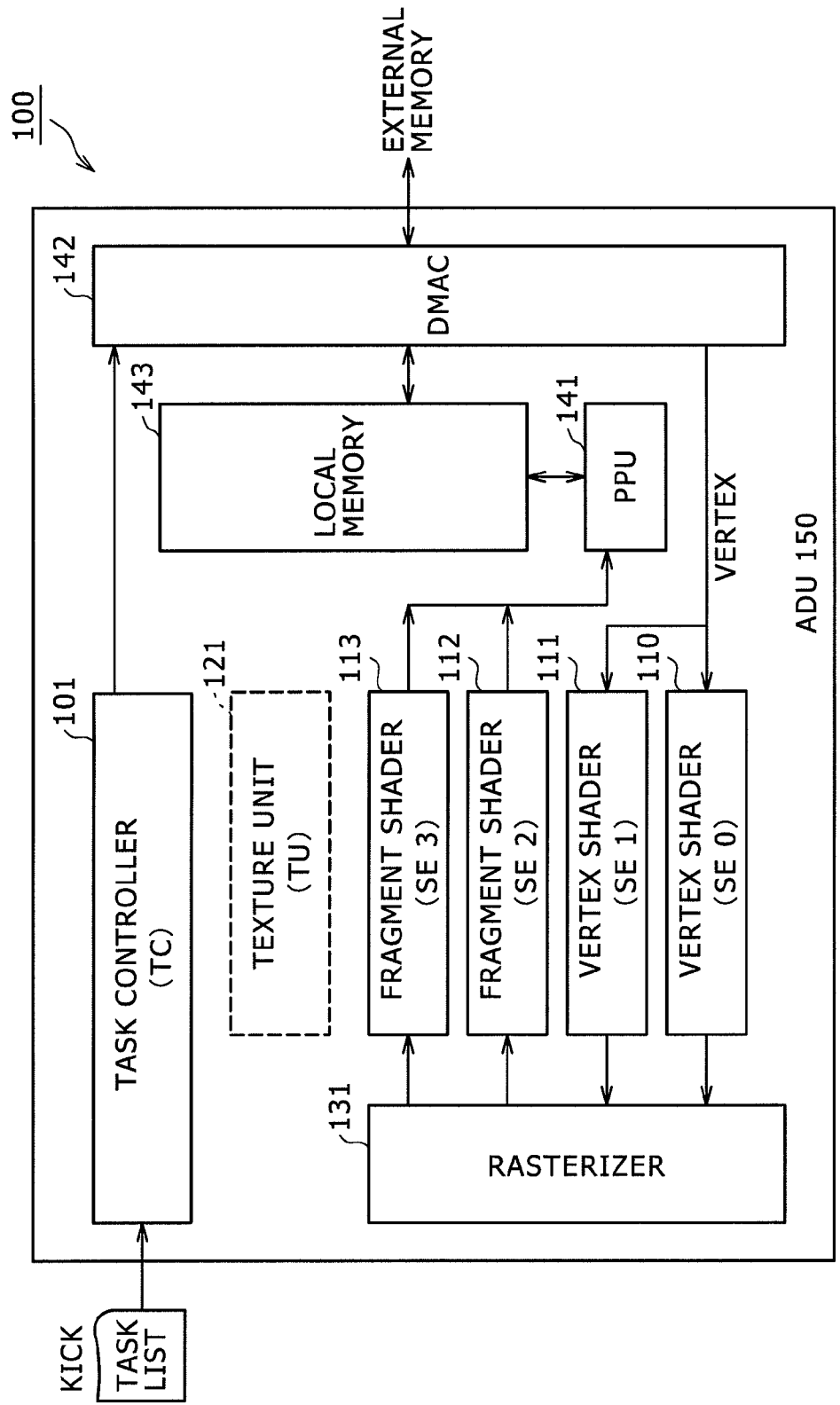
FIG. 4 is an explanatory diagram to be referred to in description of a sequence of operations carried out by the data processing section in a process to draw an image without a texture.

By referring to FIG. 4, the following description explains a processing sequence of a drawing process carried out by the data processing section 100 without a texture. Also in the case of the execution of a drawing process in the data processing section 100 without a texture, the process is carried out on the basis of a task list like one shown in FIG. 2 too. As described above, an initial setting process in an initialization pass is required as a process common to the passes in a task. After the initialization pass has been carried out, the drawing process is actually carried out in pass 1. In this case, by the same token, the TC (task controller) 101 drives the DMAC (direct memory access controller) 142 to start a DMA transfer to transfer vertex-array data to be processed from the external memory to the inside of the data processing section 100.

As shown in FIG. 4, when carrying out a drawing process without a texture, the SE 0 and the SE 1 (the shader elements 110 and 111) are used in a VS (vertex shader) process whereas the SE 2 and the SE 3 (the shader elements 112 and 113) are used in a FS (fragment shader) process.

The vertex-array data is distributed to the SE 0 and the SE 1 (the shader elements 110 and 111) set as elements to be used in the VS (vertex shader) process through the ADU (arbitration distribution unit) 150 in the following order: SE 0→SE 1→SE 0→SE 1. Arrows shown in FIG. 4 as arrows pointing to data processing functional blocks and arrows leaving data processing functional blocks form data flows set by the ADU (arbitration distribution unit) 150 in this processing. In the typical processing shown in FIG. 4, the number of shading elements (SEs) used in the VS (vertex shader) is two. It is to be noted, however, that the shading-element count of two is merely a typical value. The number of shading elements (SEs) used in the VS (vertex shader) process can be set at any integer in the range zero to four.

The SE 0 and the SE 1 (the shader elements 110 and 111) used in a VS (vertex shader) process each take the vertex-array data supplied thereto as data to be processed and carry out the VS (vertex shader) process in accordance with information set in the configuration register by execution of an internal program. Results of the VS (vertex shader) process are supplied to the rasterizer 131. At that time, the results of the VS (vertex shader) process are supplied to the rasterizer 131 through the ADU (arbitration distribution unit) 150 in the same order in which the vertex-array data is distributed to the SE 0 and the SE 1 (the shader elements 110 and 111) through the ADU (arbitration distribution unit) 150. The rasterizer 131 carries out a rasterize process and outputs the results of the process to the SE 2 and the SE 3 (the shader elements 112 and 113) used in an FS (fragment shader) process.

The number of SE 2 and the SE 3 (the shader elements 112 and 113) used in an FS (fragment shader) process is also two. Also in this case, the rasterize-process results output by the rasterizer 131 are sequentially distributed to the SE 2 and the SE 3 (the shader elements 112 and 113) set as elements to be used in the FS (fragment shader) process through the ADU (arbitration distribution unit) 150 in the following order: SE 2→SE 3→SE 2→SE 3.

The SE 2 and the SE 3 (the shader elements 112 and 113) used in an FS (fragment shader) process carry out a process on fragment elements and output the result of the process to the PPU (pixel processing unit) 141. The SE 2 and the SE 3 (the shader elements 112 and 113) also output the result of the process to the PPU (pixel processing unit) 141 through the ADU (arbitration distribution unit) 150 in the same order in which the rasterize-process results are distributed to the SE 2 and the SE 3 (the shader elements 112 and 113).

The PPU (pixel processing unit) 141 carries out a per fragment operation. Then, the DMAC (direct memory access controller) 142 transfers the result of the per fragment operation from the local memory 143 to the external memory.

Figure 5:
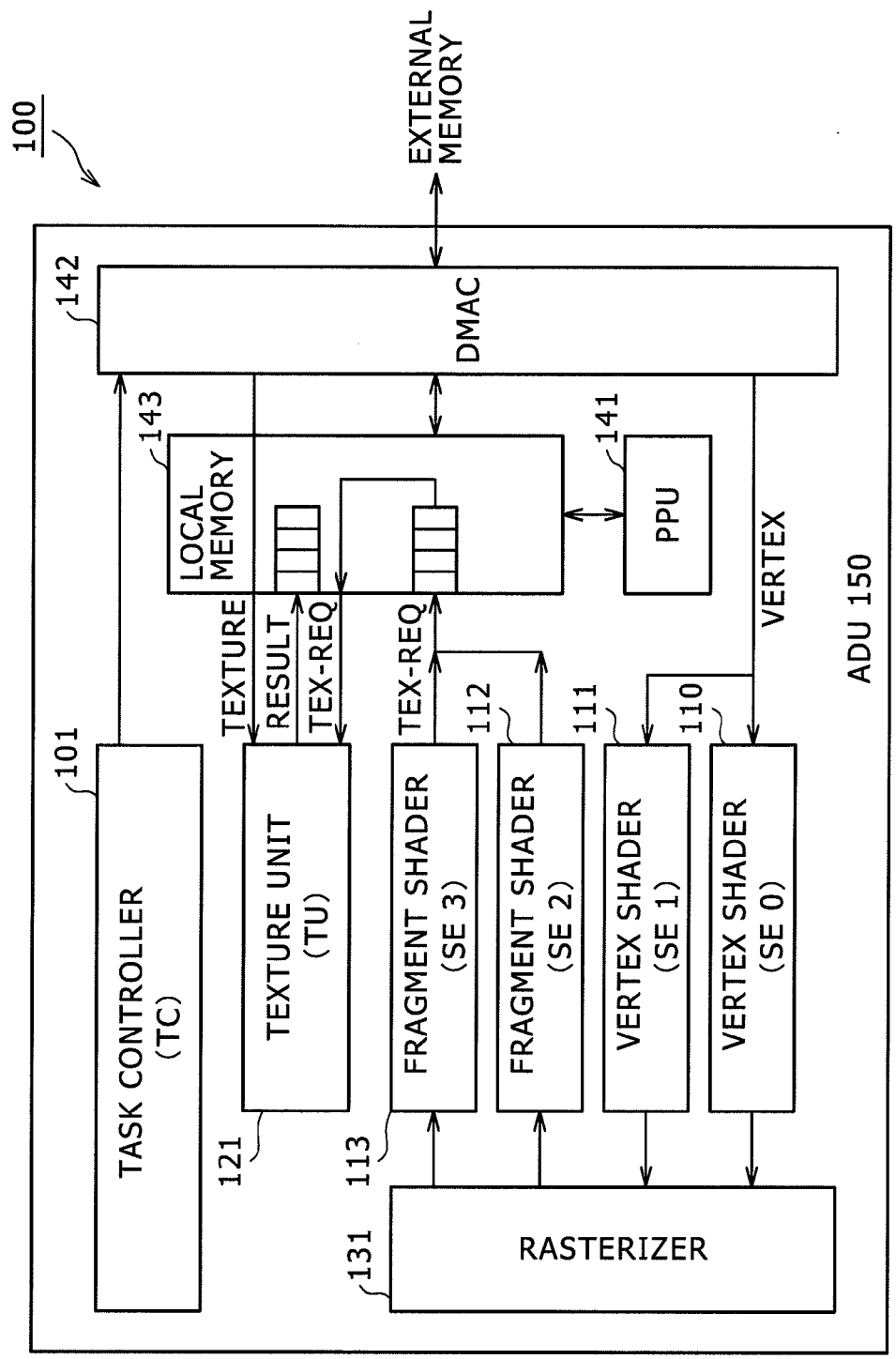
FIG. 5 is an explanatory diagram to be referred to in description of a sequence of operations carried out by the data processing section in a typical 3DCG process to draw an image by adoption of a texture mapping technique.
Figure 6:
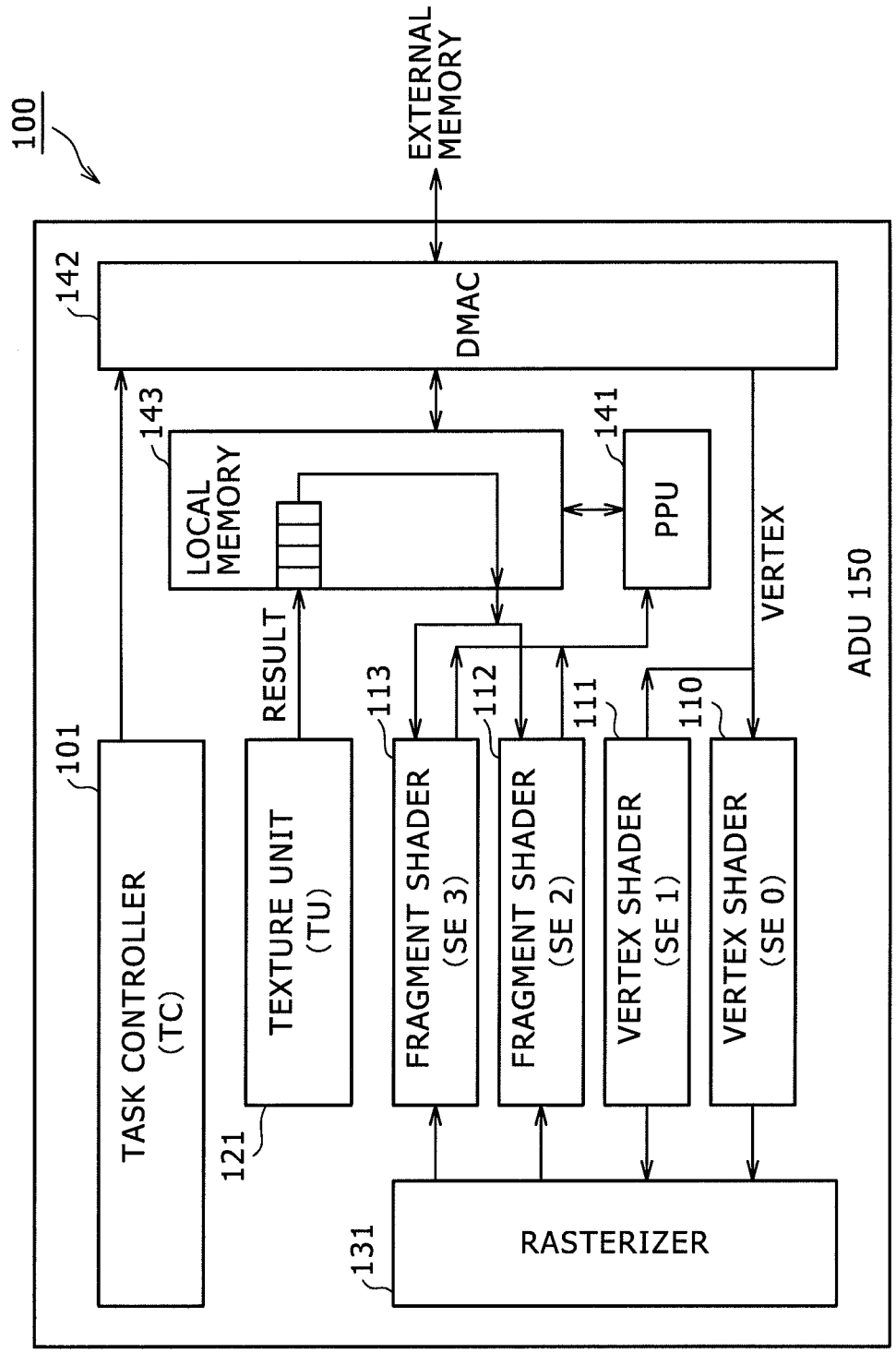
FIG. 6 is an explanatory diagram to be referred to in description of a sequence of operations carried out by the data processing section in a typical 3DCG process to draw an image by adoption of a texture mapping technique.

By referring to FIGS. 5 and 6, the following description explains a processing sequence of a drawing process carried out by the data processing section 100 adopting a texture mapping technique in the 3DCG processing.

Also in the case of the execution of a drawing process in the data processing section 100 with a texture, the process is carried out on the basis of a task list like one shown in FIG. 2 too. As described above, an initial setting process in an initialization pass is required as a process common to the passes in a task. After the initialization pass has been carried out, the drawing process is actually carried out in passes 1 and 2. In this case, by the same token, the TC (task controller) 101 drives the DMAC (direct memory access controller) 142 to start a DMA transfer to transfer vertex-array data to be processed from the external memory to the inside of the data processing section 100. The process of pass 1 is explained by referring to FIG. 5 whereas the process of pass 2 is explained by referring to FIG. 6.

First of all, the process of pass 1 is explained by referring to FIG. 5. When a drawing process with a texture is carried out, the ADU (arbitration distribution unit) 150 sets data paths according to arrows pointing to and leaving the data processing functional blocks shown in FIG. 5. In the case of this processing, the SE 0 and the SE 1 (the shader elements 110 and 111) are used in a VS (vertex shader) process whereas the SE 2 and the SE 3 (the shader elements 112 and 113) are used in a FS (fragment shader) process.

The vertex-array data is distributed to the SE 0 and the SE 1 (the shader elements 110 and 111) set as elements to be used in the VS (vertex shader) process through the ADU (arbitration distribution unit) 150 in the following order: SE 0→SE 1→SE 0→SE 1. The SE 0 and the SE 1 (the shader elements 110 and 111) used in a VS (vertex shader) process each take the vertex-array data supplied thereto as data to be processed and carry out the VS (vertex shader) process in accordance with information set in the configuration register by execution of an internal program. Results of the VS (vertex shader) process are supplied to the rasterizer 131. At that time, the results of the VS (vertex shader) process are supplied to the rasterizer 131 in the same order in which the vertex-array data is distributed to the SE 0 and the SE 1 (the shader elements 110 and 111). The rasterizer 131 carries out a rasterize process and outputs the results of the process to the SE 2 and the SE 3 (the shader elements 112 and 113) used in an FS (fragment shader) process.

The process explained above is the same as the process explained by referring to FIG. 4 as a drawing process without a texture. In the case of the drawing process with a texture, however, the SE 2 and the SE 3 (the shader elements 112 and 113) used in a FS (fragment shader) process compute a texture address from a fragment element and sends a request for a texture located at the computed texture address to the TU (texture unit) 121 by way of the local memory 143.

The TU (texture unit) 121 converts the texture address into a real address in the external memory and issues a DMA transfer request specifying the real address to the DMAC (direct memory access controller) 142 in order to acquire a pixel value of the texture. Then, the TU (texture unit) 121 carries out a filtering process on the pixel value and stores the result of the filtering process into a buffer in the local memory 143. Subsequently, as the process of pass 1 is completed, a data transfer in pass 2 is started.

The process of pass 2 is explained by referring to FIG. 6 as follows. The process carried out in pass 2 as a process ending at an operation to output a result from the rasterizer 131 has the same processing sequence as the process of pass 1. Then, the SE 2 and the SE 3 (the shader elements 112 and 113) used in a FS (fragment shader) process blend a color value output by the rasterizer 131 with a color value output by the TU (texture unit) 121 and output the result of the blending process to the PPU (pixel processing unit) 141.

The PPU (pixel processing unit) 141 carries out a per fragment operation. Then, the DMAC (direct memory access controller) 142 transfers the result of the per fragment operation from the local memory 143 to an area included in the external memory as an area used for storing color and Z results.

Figure 7:
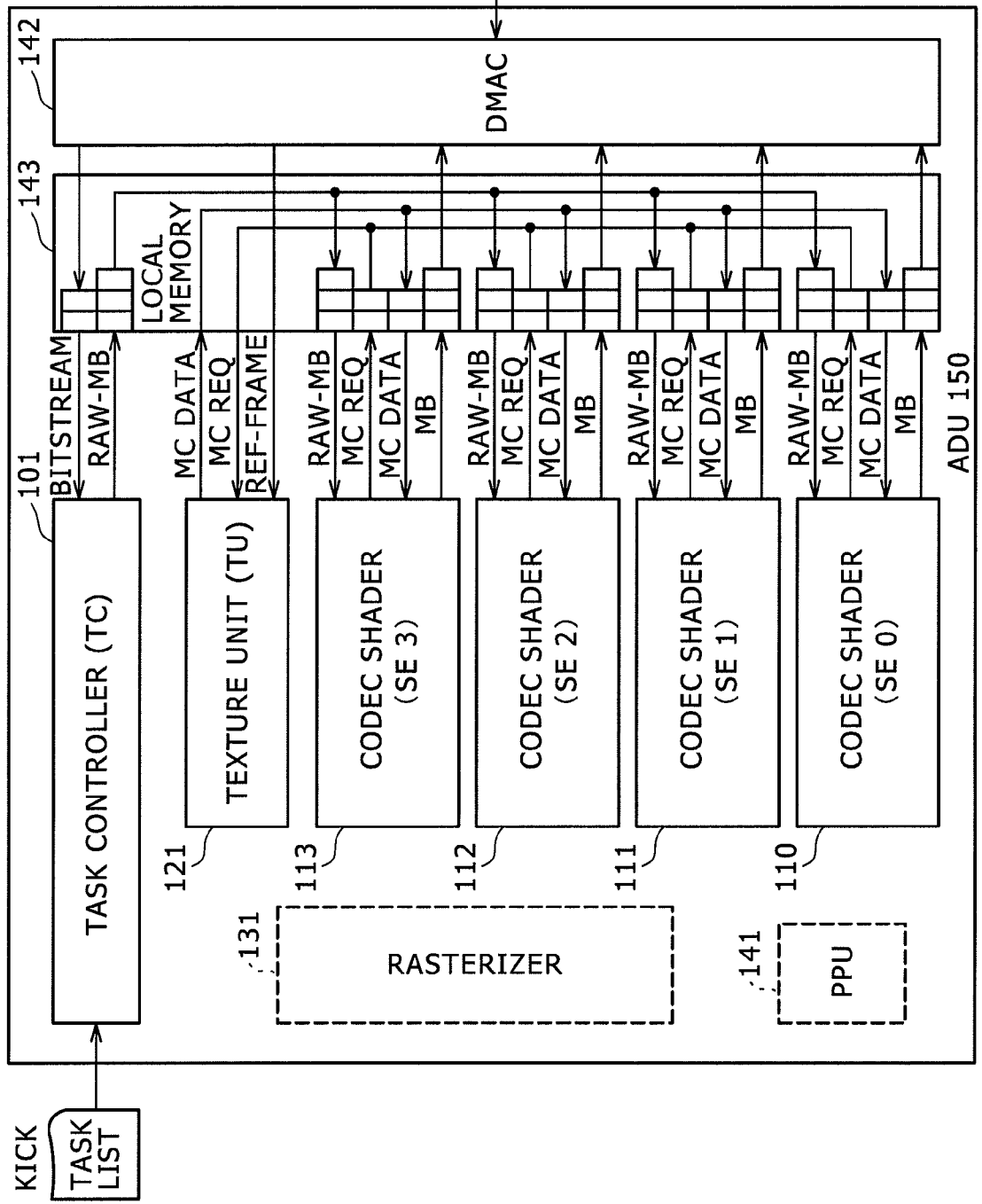
FIG. 7 is an explanatory diagram to be referred to in description of a sequence of operations carried out in an image CODEC decoding process performed by the data processing section.

By referring to FIG. 7, the following description explains the processing sequence of a decoding process carried out by the data processing section 100 as a process of the image CODEC processing. Also in the image CODEC processing, the TC (task controller) 101 interprets a request explained earlier by referring to FIG. 2 in order to start an operation in the same way as the 3DCG processing described before by referring to FIGS. 4 to 6. First of all, a DMA transfer is started in order to transfer information to be loaded into a configuration register from the external memory to the inside of the data processing section 100. Then, the TC (task controller) 101 acquires entropy-encoded bit-stream data from the external memory through the DMAC (direct memory access controller) 142 and carries out an entropy-decoding process to decode the data. The TC (task controller) 101 stores the result of the entropy-decoding process in the local memory 143. In the following description, the result of the entropy-decoding process is referred to as a raw MB (a raw macro-block).

The activation of the TC (task controller) 101 causes the raw MBs obtained as a result of the entropy-decoding process to be supplied to the SE 0 to the SE 3 (the shader elements 110 to 113). In this case, unlike the 3DCG processing, all the SE 0 to the SE 3 (the shader elements 110 to 113) each operate as a CODEC shader for carrying out the same decoding process.

The SE 0 to the SE 3 (the shader elements 110 to 113) set to operate as a CODEC shader each compute the movement vector (MV) of the macro-block (MB) processed thereby and pass on the movement vector (MV) to the TU (texture unit) 121, requesting the TU (texture unit) 121 to carry out a movement compensation (MC) process making use of the movement vector (MV). The TU (texture unit) 121 finds a real address from the movement vector (MV) and issues a DMA transfer request specifying the real address to the DMAC (direct memory access controller) 142 in order to acquire the value of a pixel at the specified real address in an already decoded reference image. If the value of the movement vector (MV) is 0.5 or 0.25 pixels, the TU (texture unit) 121 carries out a filtering process and outputs a predicted movement compensation (MC) value obtained as a result of the movement compensation (MC) process to the SE 0 to the SE 3 (the shader elements 110 to 113). During a period starting with the request issued to the TU (texture unit) 121 as a request for a movement compensation (MC) process and ending with the arrival of the result of the movement compensation (MC) process from the TU (texture unit) 121, the SE 0 to the SE 3 (the shader elements 110 to 113) carry out an inverse quantization process and an inverse orthogonal transform process. The result of the inverse quantization process and the inverse orthogonal transform process is added to the predicted movement compensation (MC) value before ending the decoding process. Finally, the decompressed macro-block (MB) is stored in the external memory through the DMAC (direct memory access controller) 142.

As described above, the data processing section 100 carries out different kinds of processing such as the 3DCG processing and the image CODEC processing. In each processing, the following data processing functional blocks are used: the SE 0 to the SE 3 (the shader elements 110 to 113), the rasterizer 131, the PPU (pixel processing unit) 141 and the TU (texture unit) 121. The SE 0 to the SE 3 (the shader elements 110 to 113), the rasterizer 131, the PPU (pixel processing unit) 141 and the TU (texture unit) 121 are each properly set so to carry out the desired processing. The process to set the SE 0 to the SE 3 (the shader elements 110 to 113), the rasterizer 131, the PPU (pixel processing unit) 141 and the TU (texture unit) 121 prior to the execution of the processing is prescribed by configuration information. Concrete processes of the processing are prescribed by a task list.

Figure 8:
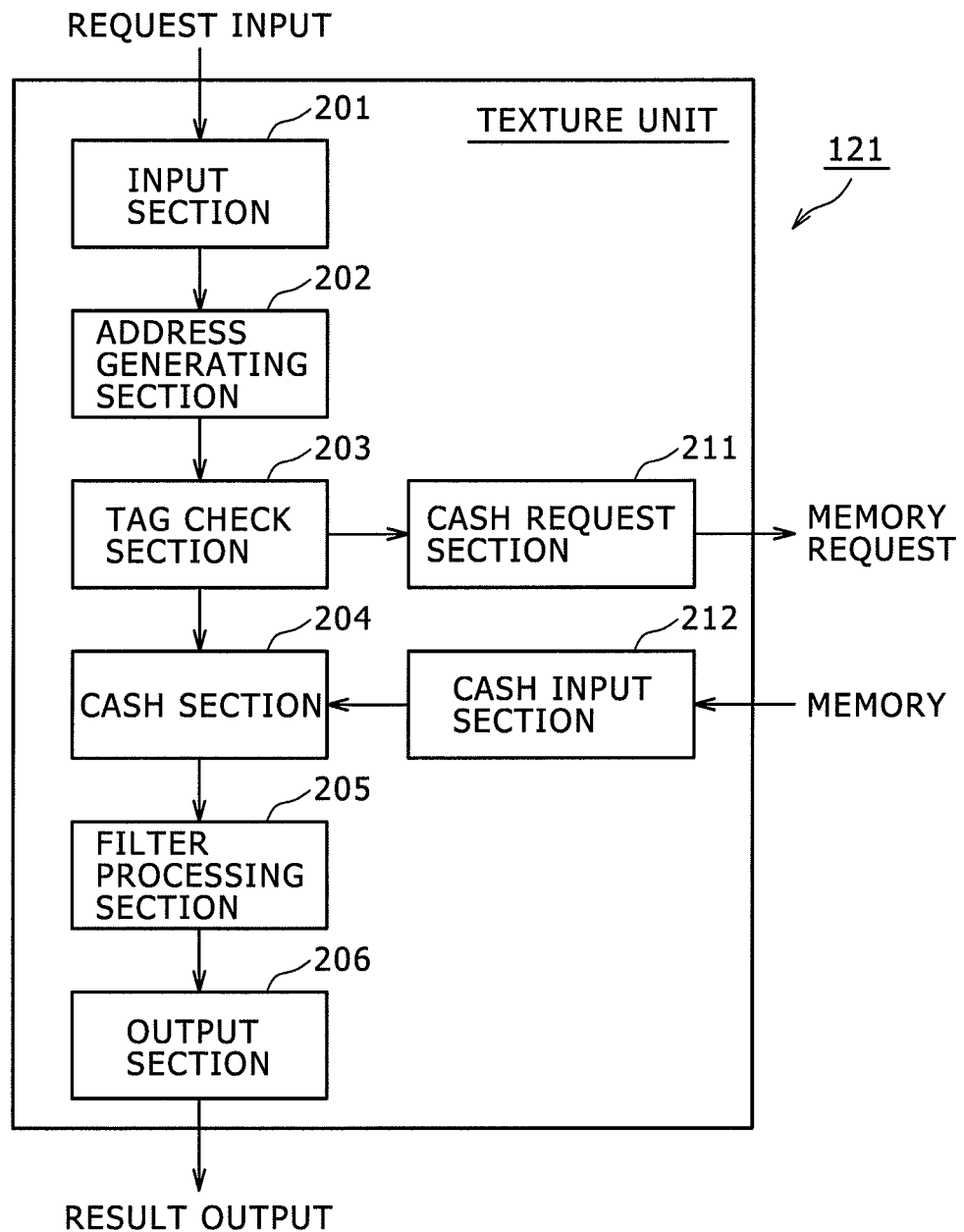
FIG. 8 is an explanatory diagram to be referred to in description of a process carried out by a TU (texture unit)

For example, the TU (texture unit) 121 carries out a texture process common to other processes. The process carried out by the TU (texture unit) 121 is explained by referring to FIG. 8. FIG. 8 is a diagram showing the configuration of the TU (texture unit) 121. As shown in the figure, an input section 201 receives a request from a shader element (SE) and passes on the request to an address generation section 202. The address generation section 202 generates a real address in the external memory and supplies this real address to a tag check section 203. If desired data at the real address does not exist in a cache section 204 provided at a stage following the tag check section 203, a cache request section 211 issues a request for a DMA transfer to the DMAC (direct memory access controller) 142. As a result of the requested DMA transfer, memory data in an area in the neighborhood of the real address is transferred from the external memory to the cache section 204 by way of the DMAC (direct memory access controller) 142 and a cache input section 212. The cache section 204 is a RAM for holding memory data. A filtering processing section 205 then reads out the desired data at the real address from the cache section 204. The filtering processing section 205 carries out a filtering process on the data and outputs the result of the filtering process to the requesting shader element (SE) by way of an output section 206.

It is to be noted that, in the TU (texture unit) 121 shown in FIG. 8, the tag check section 203, the cache request section 211, the cache input section 212 and the cache section 204 carry out their respective processes which are each independent of an algorithm. Thus, the tag check section 203, the cache request section 211, the cache input section 212 and the cache section 204 are each implemented entirely as a logic circuit. In addition, the filtering processing section 205 carries out a filtering process by performing additions, subtractions, multiplications and divisions on eight-bit luminance values and eight-bit color values in both the 3DCG processing and the image CODEC processing. Thus, the filtering processing section 205 is implemented by logic circuits almost entirely.

Figure 9:
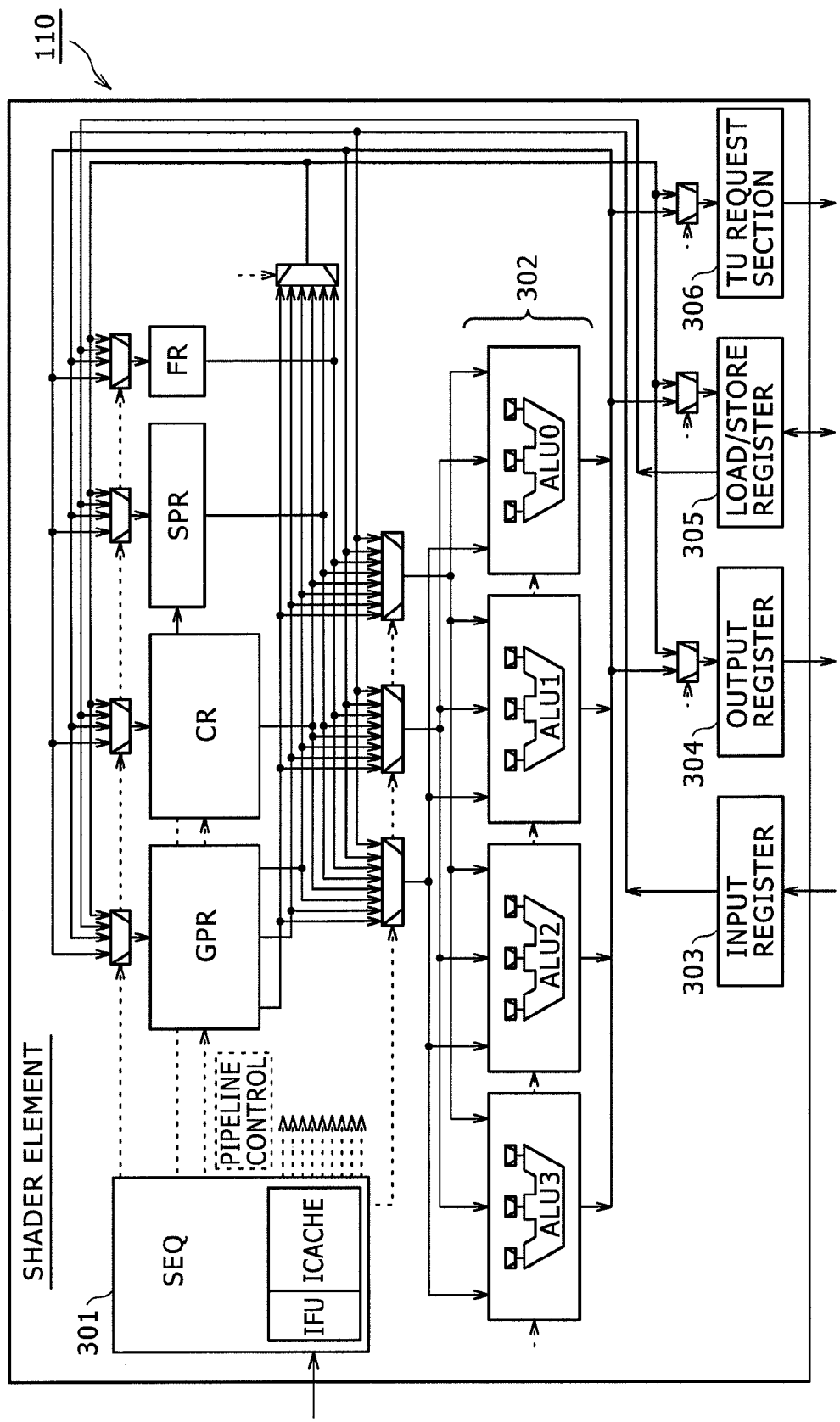
FIG. 9 is an explanatory diagram to be referred to in description of a typical configuration of an SE (the shader element)

Next, a typical configuration of the shader element (SE) is explained by referring to FIG. 9. As described earlier, the shader element (SE) carries out the following operations and processes:

(a): a vertex element operation of the vertex shader process in the 3DCG processing;

(b): a fragment element operation of the fragment shader process in the 3DCG processing; and (c): the macro-block quantization and inverse quantization processes, the orthogonal transformation and inverse orthogonal transform processes, an intra prediction compensation process, a block integration process and an in-loop filtering process in the image CODEC processing. In the case of this embodiment, the operations (a) and (b) as well as the processes (c) are carried out as SIMD parallel processing by execution of programs. That is to say, the shader element (SE) is configured to operate as a data processing functional block for carrying out a variety of processes in accordance with an instruction acquired by performing an instruction fetch operation. The shader element (SE) has a configuration capable of carrying out various kinds of data processing in accordance with a setting process performed by the control section.

In particular, FIG. 9 is a block diagram showing the configuration of the SE 0 (the shader element 110). However, the configurations of the other SE 1 to the SE 3 (the shader elements 111 to 113) are same with the configuration shown in the figure. The SE 0 (the shader element 110) is a processor for carrying out four SIMD operations concurrently by execution of a program. The shader element 110 employs an input register 303 for inputting an operand and an arithmetic logic unit 302 for carrying out an operation suitable for the operand on the operand. The shader element 110 also includes a sequencer 301 and an output register 304. The sequencer 301 functions as a control section for executing data processing control on the basis of configuration information of the data processing and a data processing program.

That is to say, the sequencer 301 functions as a control section for controlling the data processing carried out by the SE 0 (the shader element 110). Thus, the sequencer 301 is a block functioning as a control section for prescribing operations to be carried out by the information processing apparatus on the basis of an instruction and a register set by an external element. The register set by an external element is referred to as a configuration register. The control section (sequencer 301) employs the following configuration elements:

(a): IFU (Instruction Fetching Unit)

An instruction fetching unit (IFU) is a block for carrying out an operation to fetch an instruction and stores the instruction in an instruction cache referred to as ICACHE.

(b): ICACHE

The instruction cache (ICACHE) is a cache for storing instructions fetched by the IFU.

The instruction fetching unit (IFU) fetches an instruction and stores the instruction in the instruction cache (ICACHE). Then, in accordance with control executed by the sequencer 301, which serves as a control section, on the basis of the instruction, the SE 0 (the shader element 110) carries out a process on data received by the input register 303 and outputs the result of the process to the output register 304. In FIG. 9, ALU (Arithmetic Logic Unit) 0 to ALU 3 form the arithmetic logic unit 302, which functions as an arithmetic logic circuit for carrying out four operations concurrently. Notations GPR, CR, SPR and FR each denote a buffer used for storing a constant and a processing intermediate result. A load/store register 305 is a register used for saving data received from the external memory. A TU (texture unit) request section 306 is a register used for storing an issued request.

In a vertex shader process carried out as a vertex process of the 3DCG processing, the coordinates (x, y, z, w) of a vertex are taken as data being processed in accordance with the following equation:

$$(x',y',z',w')=\text{ModelView \& Projection matrix}*(x,y,z,w)$$

In a fragment shader process of the 3DCG processing, on the other hand, values (r, g, b, a) are taken as data being processed and data processing is carried out in accordance with the following equation:

$$(r,g,b,a)=(r1,g1,b1,a1)+(r2,g2,b2,a2)$$

where (r, g, b, a) is red, green and blue color values of a pixel and an alpha value thereof.

In the case of the image CODEC processing, on the other hand, a one-dimensional integer DCT process conforming to the MPEG-4AVC/H.264 standard is typically carried out. In this DCT process, DCT transformation is applied to an input (a0, a1, a2, a3) serving as the subject of transformation in accordance with the following equation:

$$(A0,A1,A2,A3)=\text{Transformation matrix}*(a0,a1,a2,a3).$$

As described above, all the pieces of data processing are carried out on the basis of similar computations.

As described above, the 3DCG vertex shader (VS) process, the 3DCG fragment shader (FS) process and the CODEC macro-block process each entail a large number of vector computations. Thus, if data processing is carried out by making use of an SIMD processor like the shader element (SE) having the configuration explained earlier by referring to FIG. 9 for example, the data processing can be performed with a high degree of efficiency.

In addition, the 3DCG shader processes demand that the processes be carried out in an environment allowing the designer (or the creator) to do various kinds of programming and it is necessary to get rid of the programming works. However, this demand also means a need for processor processing. In addition, the macro-block process of the image CODEC processing is carried out in a way varying among a variety of CODEC standards such as JPEG, MPEG-4 and MPEG-4AVC/H.264. Thus, rather than performing the macro-block process of the image CODEC processing by making use of a fixed logic circuit, it is desirable to let the SE (shader element) shown in FIG. 9, that is, an SIMD-type processor, carry out the macro-block process of the image CODEC processing as processor processing that can be changed with ease in accordance with the adopted standard.

In the information processing apparatus according to the present embodiment, processes carried out as 3DCG and CODEC processes are properly allocated to two data processing functional blocks, i.e., the shader element (SE) and the TU (texture unit) 121. To put it concretely, as described earlier by referring to FIGS. 4 to 6, the vertex shader (VS) and fragment shader (FS) processes of the 3DCG processing are carried out by making use of the shader element (SE) as vertex shader (VS) and fragment shader (FS) elements. On the other hand, the image CODEC processing is carried out by making use of the shader element (SE) as CODEC shader elements as shown in FIG. 7. It is to be noted that the TU (texture unit) 121 serves as a unit common to the 3DCG processing and the image CODEC processing, being used for carrying out a texture process in both the 3DCG processing and the image CODEC processing.

As described above, the vertex shader (VS) and fragment shader (FS) processes of the 3DCG processing are carried out by making use of the shader element (SE) as vertex shader (VS) and fragment shader (FS) elements. In this case, configuration information for the process to be carried out is set and the process is carried out by applying the task list shown in FIG. 2.

As described above, in the information processing apparatus according to the embodiment, there is provided a configuration in which the same data processing functional block can be used for carrying out a variety of processes. Thus, the area of the hardware circuit can be decreased. In addition, the DMAC (direct memory access controller) 142, the local memory 143 and the ADU (arbitration distribution unit) 150 do not carry out logic processing. Instead, the DMAC (direct memory access controller) 142 carries out an operation to exchange data with the external memory, the local memory 143 serves as an internal buffer whereas the ADU (arbitration distribution unit) 150 functions as a data flow controller. Thus, the DMAC (direct memory access controller) 142, the local memory 143 and the ADU (arbitration distribution unit) 150 can each be used as a component common to both the 3DCG processing and the image CODEC processing. That is to say, in the configuration of the data processing section 100 shown in FIG. 1, only the rasterizer 131 and the PPU (pixel processing unit) 141 are dedicated to the 3DCG processing.

Next, other embodiments implementing the information processing apparatus provided by the present invention are explained. A variation of the 3DCG drawing process described earlier is explained. That is to say, the following description explains a typical case of changing a ratio of the number of SEs (shader elements) each selected among a plurality of shader elements as a shader element used in the vertex shader (VS) process to the number of SEs (shader elements) each selected among the same shader elements as a shader element used in the fragment shader (FS) process.

In the configuration explained earlier by referring to FIG. 4 as the configuration of the data processing section 100, the 3DCG processing is carried out by selecting 2 shader elements, i.e., the SE 0 and the SE 1 (the shader elements 110 and 111), among the four shader elements employed in the data processing section 100. That is, the SE 0 to the SE 3 (the shader elements 110 to 113), as shader elements each used in the vertex shader (VS) process and selecting the two other shader elements, i.e., the SE 2 and the SE 3 (the shader elements 112 and 113) among the SE 0 to the SE 3 (the shader elements 110 to 113) as shader elements each used in the fragment shader (FS) process.

Figure 10:
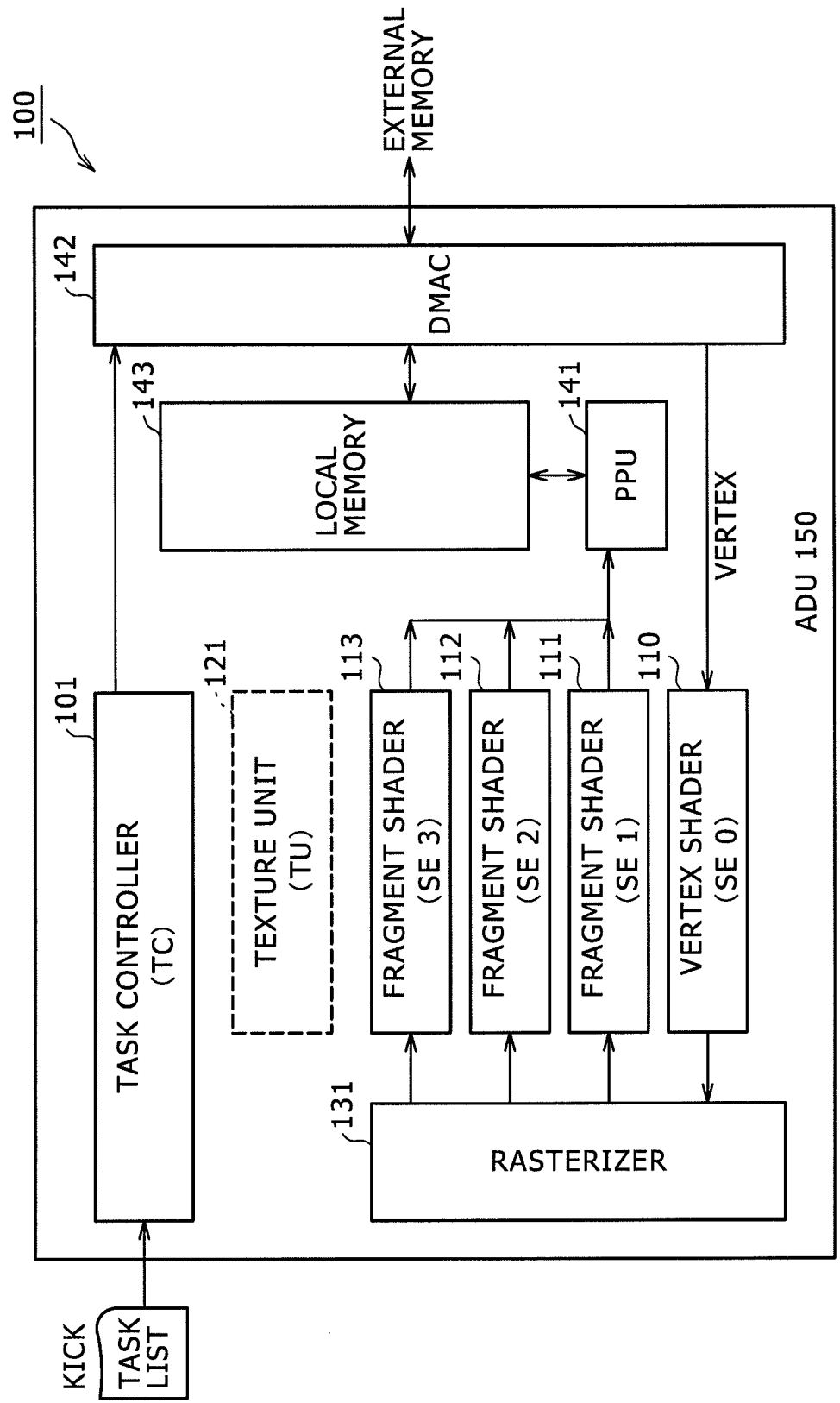
FIG. 10 is an explanatory diagram to be referred to in description of a typical configuration of the data processing section in which 1 of 4 SEs (the shader elements) is set as a VS (vertex shader) element and the 3 remaining SEs are each set as an FS (fragment shader) element.

In a configuration shown in FIG. 10 as a typical configuration of the data processing section 100, the 3DCG processing is carried out by selecting 1 shader element 110 (SE 0) among the four shader elements, that is, the SE 0 to the SE 3 (the shader elements 110 to 113), as a shader element used in the vertex shader (VS) process and selecting the three other shader elements, i.e., the SE 1 to the SE 3 (the shader elements 111 to 113) among the SE 0 to the SE 3 (the shader elements 110 to 113) as shader elements each used in the fragment shader (FS) process. That is to say, in the configuration shown in FIG. 10 as a typical configuration of the data processing section 100, the shader element 110 (SE 0) is selected among the four shader elements, that is, the SE 0 to the SE 3 (the shader elements 110 to 113), and set as a shader element used in the vertex shader (VS) process. On the other hand, the three other shader elements, i.e., the SE 1 to the SE 3 (the shader elements 111 to 113), are selected among the SE 0 to the SE 3 (the shader elements 110 to 113) and each set as a shader element used in the fragment shader (FS) process.

In the 3DCG processing, the state of balance between the loads of the vertex shader (VS) process and the fragment shader (FS) process changes in accordance with the application and/or the scene being processed or the object of processing. Thus, by making the number of shader elements each set as a vertex shader (VS) element and the number of shader elements each set as a fragment shader (FS) element variable, the balance between the loads can be established. In a process to draw an object for which the polygon is big, the load of the vertex shader (VS) process is small but the load of the fragment shader (FS) process is large for example, the number of shader elements each set as a vertex shader (VS) element is decreased but the number of shader elements each set as a fragment shader (FS) element is increased. In a process to draw an object for which the polygon is small and the load of the vertex shader (VS) process is large, on the other hand, the number of shader elements each set as a vertex shader (VS) element is increased in order to raised the processing speed.

If the balance between the loads of the vertex shader (VS) process and the fragment shader (FS) process or the ratio of the former to the latter needs to be set at 1:100 representing a big difference between the former and the latter, such a balance can be established through allocation of time to the former and the latter.

Figure 11:
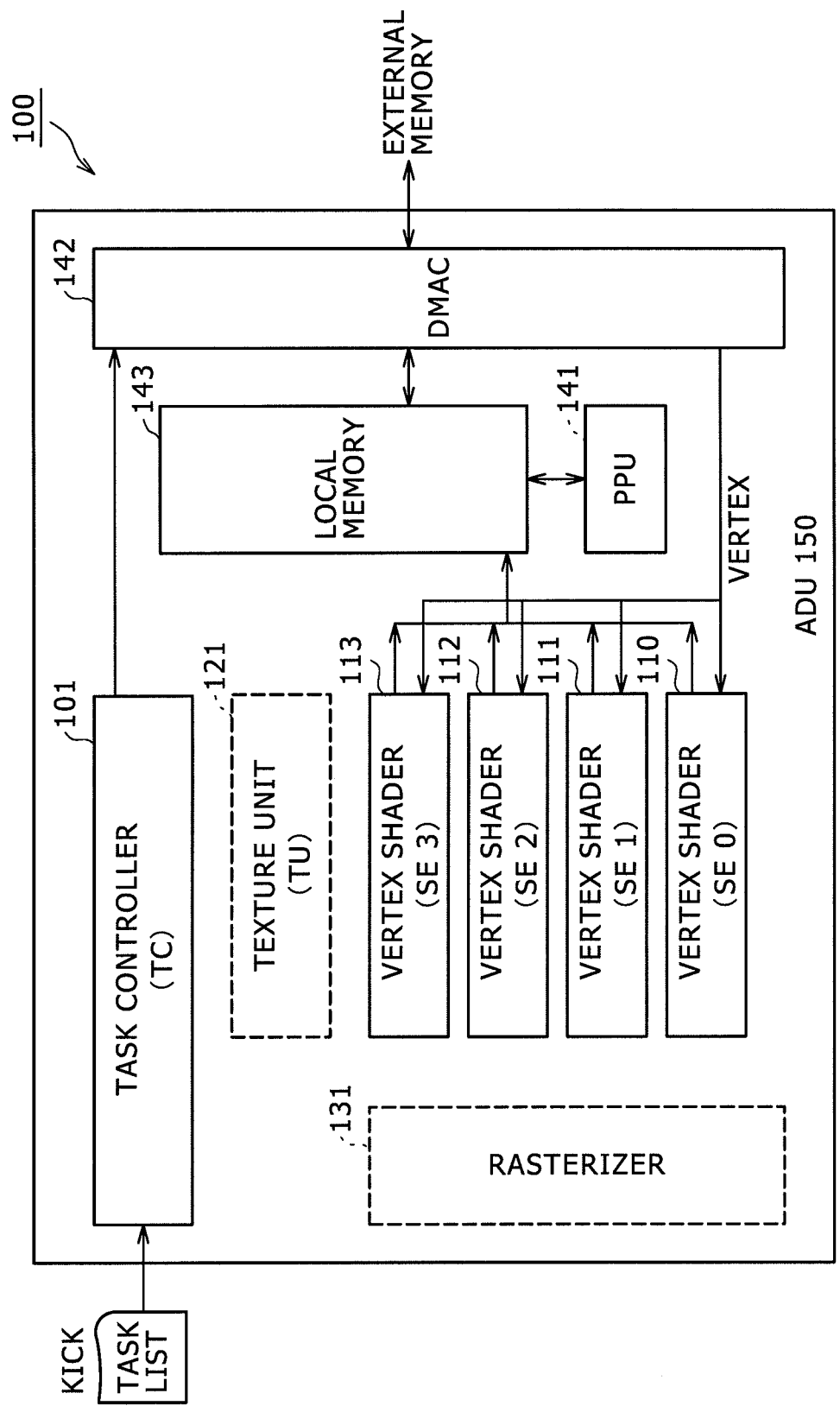
FIG. 11 is an explanatory diagram to be referred to in description of a typical configuration of the data processing section in which 4 SEs (the shader elements) are each set as a VS (vertex shader) element.
Figure 12:
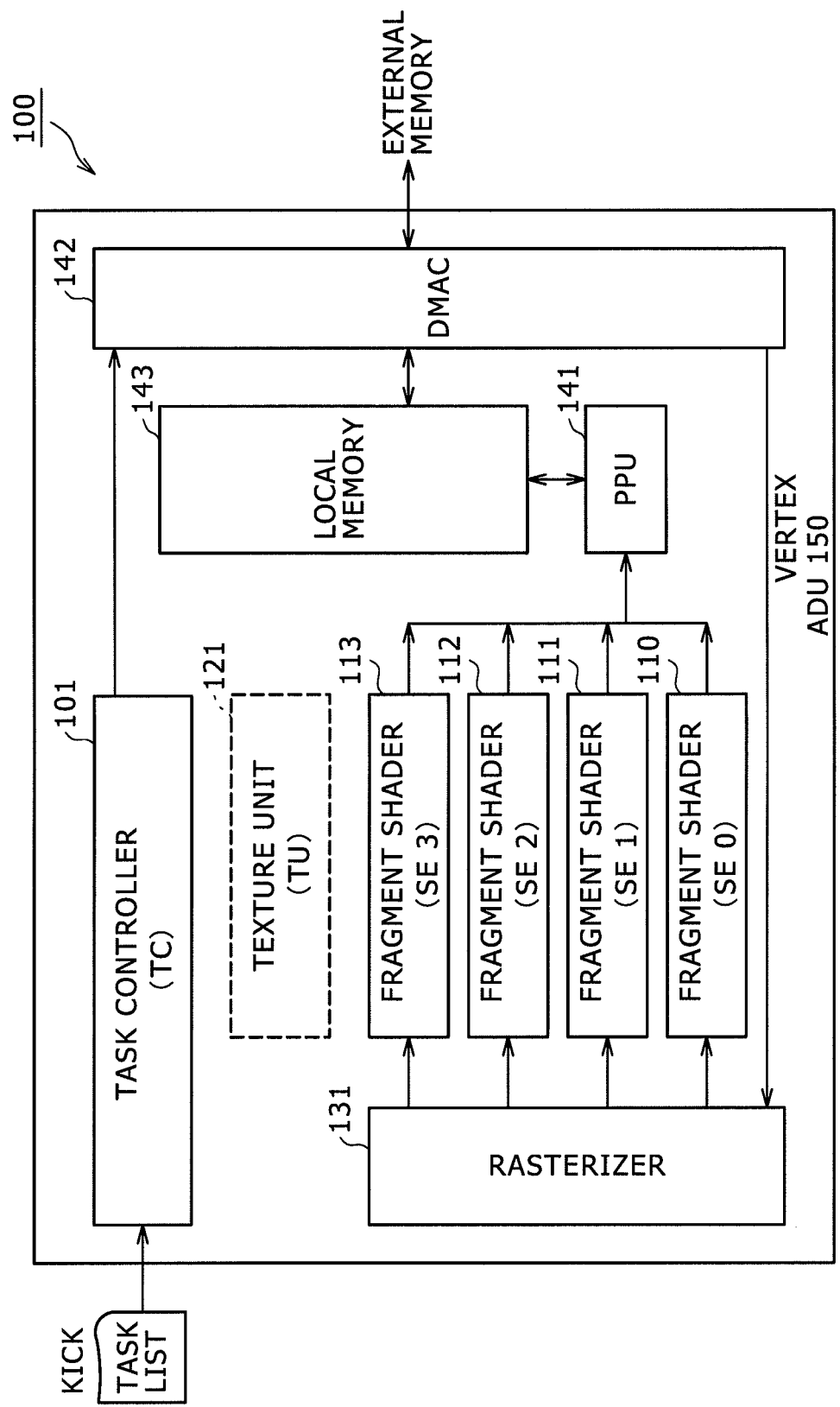
FIG. 12 is an explanatory diagram to be referred to in description of a typical configuration of the data processing section in which 4 SEs (the shader elements) are each set as an FS (fragment shader) element.

FIG. 11 is a block diagram showing a typical configuration in which all the SE0 to the SE3 (the shader elements 110 to 113) are each set to function as a vertex shader (VS) element. In this case, all the SE0 to the SE3 (the shader elements 110 to 113) each carry out a vertex shader (VS) process. The results of the vertex shader (VS) processes are supplied to the local memory 143 to be stored temporarily therein. FIG. 12 is a block diagram showing another typical configuration in which all the SE0 to the SE3 (the shader elements 110 to 113) are each set to function as a fragment shader (FS) element later on. In this case, the results of the vertex shader (VS) processes are transferred from the local memory 143 to the rasterizer 131. A rasterize result output by the rasterizer 131 is distributed to the SE0 to the SE3 (the shader elements 110 to 113) each already set to function as a fragment shader (FS) element. The SE0 to the SE3 (the shader elements 110 to 113) each already set to function as a fragment shader (FS) element each carry out a fragment shader (FS) process on the rasterize result. The results of the fragment shader (FS) processes are supplied to the PPU (pixel processing unit) 141. The PPU (pixel processing unit) 141 carries out a per fragment operation on the results of the fragment shader (FS) processes and supplies the result of the per fragment operation to the external memory by way of the local memory 143 and the DMAC (direct memory access controller) 142.

The configurations shown in FIGS. 11 and 12 are typical configurations for carrying out the image drawing process explained before by referring to FIG. 4 as a process to draw an image without a texture. To be more specific, a time period is allocated to the SE0 to the SE3 (the shader elements 110 to 113) each set to function as a vertex shader (VS) element and another time period is allocated the SE0 to the SE3 each set to function as a fragment shader (FS) element in order for the SE0 to the SE3 to carry out the process to draw an image without a texture on a time-division basis.

In the time period allocated to the SE0 to the SE3 (the shader elements 110 to 113) each set to function as a vertex shader (VS) element as shown in FIG. 11, the ADU (arbitration distribution unit) 150 distributes vertex-array data to the SE0 to the SE3 (the shader elements 110 to 113) in the following order: SE 0→SE 1→SE 2→SE 3. Arrows pointing to and leaving data processing functional blocks shown in FIG. 11 represent data flows set by the ADU (arbitration distribution unit) 150 in this embodiment.

The SE0 to the SE3 (the shader elements 110 to 113) each set to function as a vertex shader (VS) element each carry out data processing on vertex-array data received thereby in accordance with the setting of a configuration register and an internal program. In the configuration explained before by referring to FIG. 4, the data processing section 100 is set to supply the results of the data processing to the rasterizer 131. In this embodiment, however, the results of the data vertex element (VS) processes are stored in the local memory 143. In this case, the results of the data vertex element (VS) processes are stored temporarily in the local memory 143 in the same order as that adopted by the ADU (arbitration distribution unit) 150 to supply vertex information to the SE0 to the SE3 (the shader elements 110 to 113).

Later on, during and after the time period allocated to the SE0 to the SE3 (the shader elements 110 to 113) each set to function as a fragment shader (FS) element as shown in FIG. 12, the results of the data vertex element (VS) processes are transferred from the local memory 143 to the rasterizer 131. Rasterize results output by the rasterizer 131 are distributed to the SE0 to the SE3 (the shader elements 110 to 113) each already set to function as a fragment shader (FS) element.

The rasterize results output by the rasterizer 131 are distributed to the SE0 to the SE3 (the shader elements 110 to 113) each already set to function as a fragment shader (FS) element in the following order: SE 0→SE 1→SE 2→SE 3. The SE2 and the SE3 (the shader elements 112 and 113) each already set to function as a fragment shader (FS) element each carry out a fragment shader (FS) process on the rasterize results and output the results of the fragment shader (FS) processes to the PPU (pixel processing unit) 141. The operations to output the results of the fragment shader (FS) processes to the PPU (pixel processing unit) 141 are controlled by the ADU (arbitration distribution unit) 150 so that the results are output in the same order in which the fragment shader (FS) processes are carried out by the SE0 to the SE3 (the shader elements 110 to 113). The PPU (pixel processing unit) 141 carries out a per fragment operation on the results of the fragment shader (FS) processes and supplies the result of the per fragment operation to the external memory by way of the local memory 143 and the DMAC (direct memory access controller) 142.

By setting the ratio of a time period allocated to the SE0 to the SE3 (the shader elements 110 to 113) each configured to function as a vertex shader (VS) element to a time period allocated to the SE0 to the SE3 (the shader elements 110 to 113) each configured to function as a fragment shader (FS) element at a typical rate of 1:100 for example, the data processing can also be carried out as processing adapted to a case in which the balance between the loads of the vertex shader (VS) process and the fragment shader (FS) process is 1:100. This time period allocation can appropriately change based on the setting information in the configuration information and the task list.

As described above, the TC (task controller) 101 functioning as a control section executes control to set a proper number of shader elements each selected among a plurality of shader elements to serve as a vertex shader (VS) element for carrying out a vertex shader (VS) process and the remaining shader elements as fragment shader (FS) elements for carrying out fragment shader (FS) processes in parallel to the vertex shader (VS) processes. In addition, the TC (task controller) 101 also sets the ratio of a time period allocated to the element shaders each configured to function as a vertex shader (VS) element to a time period allocated to the element shaders each configured to function as a fragment shader (FS) element.

In the configuration shown in FIG. 12, all the SE0 to the SE3 (the shader elements 110 to 113) are each configured to function as a fragment shader (FS) element. It is to be noted, however, that this configuration can also be applied to an application in which, typically, an upper-level host CPU outside the data processing section 100 takes charge of a coordinate transformation process as a vertex shader (VS) process whereas the data processing section 100 itself processes vertex-array data of a clip coordinate system.

Figure 13:
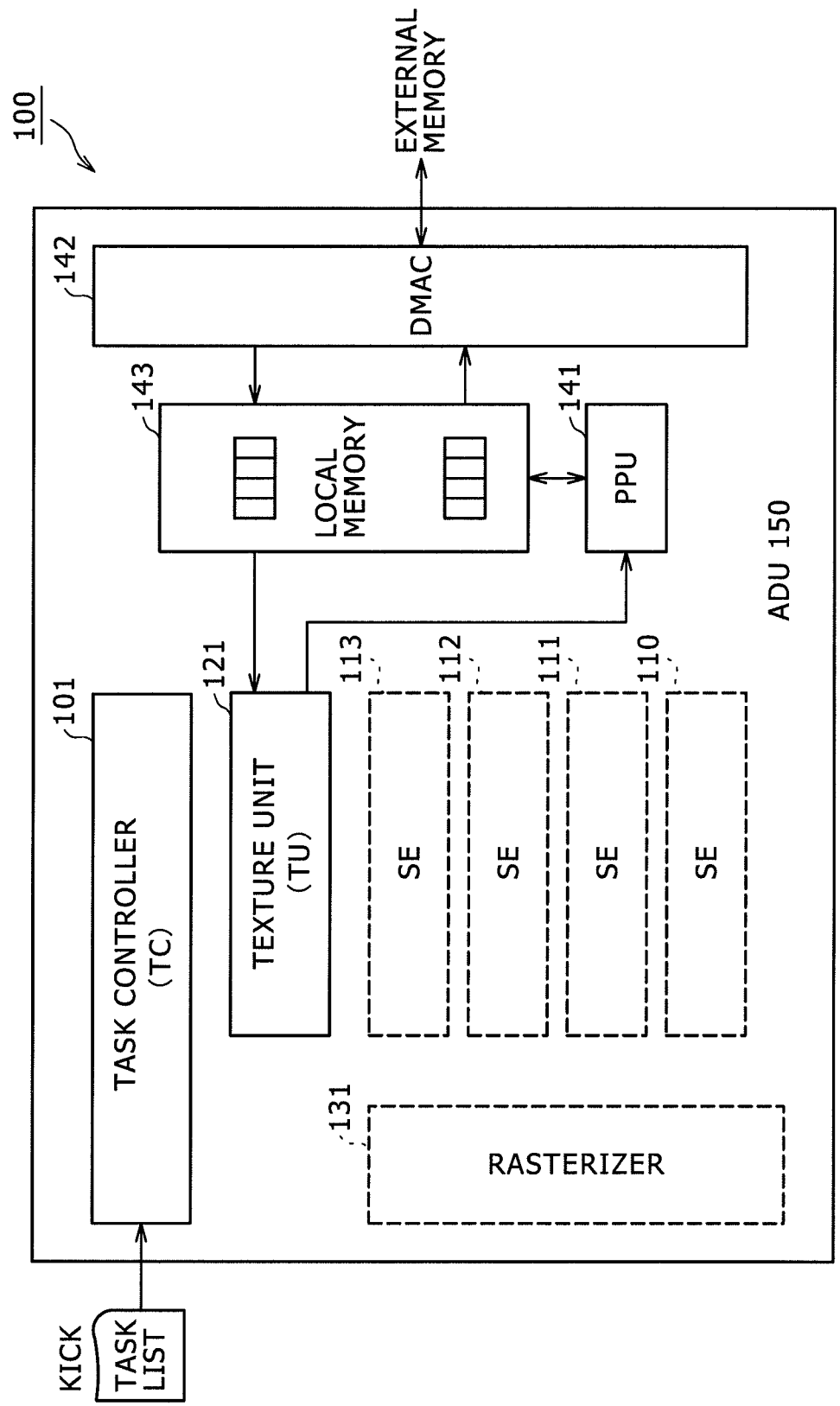
FIG. 13 is an explanatory diagram to be referred to in description of a sequence of operations carried out by the data processing section in a process to generate a contracted image.

By referring to FIG. 13, the following description explains the data processing sequence of a contracted-image generation process carried out by the data processing section 100. There are standards for prescribing CG (computer graphics) programming interfaces. An example of the standards is OpenGL 2.0 which prescribes a MIPMAP image generation function. The MIPMAP image generation function is a contracted-image generation function for generating a small texture from a large one. In addition, a movement detection process of the image CODEC processing normally adopts a technique of carrying out a coarse search operation on a contracted image and a fine search operation on the original image. Also in the case of the movement detection process, the contracted-image generation function is used.

FIG. 13 is an explanatory diagram referred to in description of the data processing sequence of a contracted-image generation process carried out by the data processing section 100. Also in the case of the contracted-image generation process, a task list shown in FIG. 2 is set, data processing functional blocks are configured to carry out the contracted-image generation process on the basis of the task list and the contracted-image generation process itself is then performed. The TC (task controller) 101 sets configuration information to be used as setting information on the basis of information included in the task list. A DMA transfer is carried out to transfer an original image from the external memory to the TU (texture unit) 121 by way of the DMAC (direct memory access controller) 142 and the local memory 143.

The TU (texture unit) 121 carries out a bilinear filtering process on the original image and outputs the result of the process to the PPU (pixel processing unit) 141. The PPU (pixel processing unit) 141 carries out a color format conversion process on the image received from the TU (texture unit) 121 as a result of the bilinear filtering process and stores the result of the color format conversion process in the local memory 143. The color format conversion process carried out by the PPU (pixel processing unit) 141 is a process to convert the eight-bit format of data representing RGBA into a format of five and/or six bits. The RGBA data is the color and alpha values of each pixel. For example, in order to reduce the number of circuits employed in the data processing section 100, it is also possible to provide a configuration in which all processes in the TU (texture unit) 121 are carried out in eight-bit units but the format of an image supplied to the data processing section 100 is changed by the TU (texture unit) 121 in the color format conversion process. Originally, it is the PPU (pixel processing unit) 141 that is provided with the color format conversion function for carrying out the color format conversion process on output data.

In a MIPMAP image generation process carried out as a contracted-image generation process for generating a small texture from a large one, the size of an image is reduced to half the size by carrying out a size halving operation repeatedly. For example, an original image having a size of 512 pixels× 512 pixels is subjected to the size halving operation carried out repeatedly in order successively reduce the size to ½, ¼⅛ and so on so as to decrease the number of pixels to 256×256, 128×128 and so on to the final pixel count of 1×1 of the desired contracted image.

To put it in detail, a current image having a size equal to half the size of a preceding image is temporarily stored in the local memory 143 before being output to the external memory by way of the DMAC (direct memory access controller) 142. Then, the current image having a size equal to half the size of a preceding image is subjected to the next size halving operation and the result of the next size halving operation is temporarily stored in the local memory 143 as a new current image before again being output to the external memory by way of the DMAC (direct memory access controller) 142. In this way, a current image temporarily stored in the local memory 143 is used for generating a new current image. Thus, during the repeated execution of to the size halving operation, it is no longer necessary to acquire the image, which has been once output to the external memory, from time to time. As a result, the bandwidth of an external bus and the power consumption can be decreased. In this process, the ADU (arbitration distribution unit) 150 sets the setting of flows of data.

As described above, the TU (texture unit) 121 has a configuration for carrying out a process to generate a contracted image. The contracted image generated by the TU (texture unit) 121 is output to the external memory by way of the local memory 143 and a contracted image temporarily stored in the local memory 143 is again acquired to be subjected to a size halving operation carried out repeatedly in order to generate a contracted image having the desired size.

Figure 14:
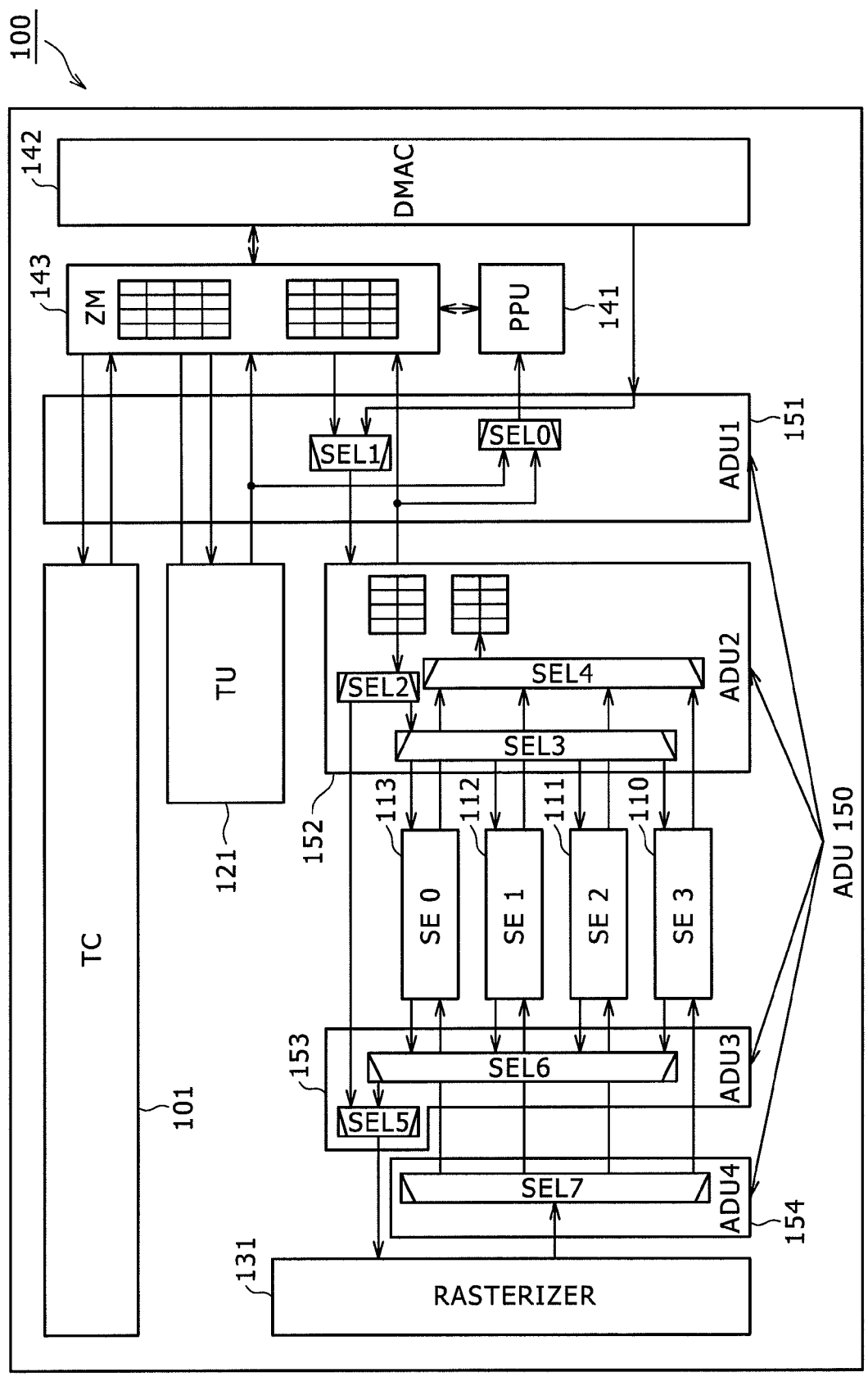
FIG. 14 is an explanatory diagram to be referred to in description of processing carried out by an ADU (Arbitration Distribution Unit) to control flows of data.

By referring to FIG. 14, the following description explains a process carried out by the ADU (arbitration distribution unit) 150 to control flows of data. The ADU (arbitration distribution unit) 150 controls data transfers among configuration elements employed in the data processing section 100. As shown in the figure, the configuration elements employed in the data processing section 100 include the SE 0 to the SE 3 (the shader elements 110 to 113), the TU (texture unit) 121, the rasterizer 131, the PPU (pixel processing unit) 141, the DMAC (direct memory access controller) 142 and the local memory 143.

As shown in FIG. 14, the ADU (arbitration distribution unit) 150 employs four sub-ADUs (ADU1 to ADU4) denoted by reference numerals 151 to 154 respectively. The ADU1 151 controls data transfers between the DMAC (direct memory access controller) 142 and other data processing functional blocks as well as data transfers between the local memory 143 and other data processing functional blocks. The ADU1 151 employs two selectors, i.e., a SEL 0 and a SEL 1.

The selector SEL 0 in the ADU1 151 has a function for selecting an input to be supplied to the PPU (pixel processing unit) 141. In the normal 3DCG processing, the selector SEL 0 selects data output by the ADU2 152 to the ADU2 151 and outputs the selected data to the PPU (pixel processing unit) 141. The data output by the ADU2 152 to the ADU1 151 is one of the pieces of data output by the SE 0 to the SE 3 (the shader elements 110 to 113). In the contracted-image generation process, on the other hand, the selector SEL 0 selects the output of the TU (texture unit) 121 and supplies the selected output to the PPU (pixel processing unit) 141. Set as setting information in the configuration information, the select function of the selector SEL 0 is a function to carry out a predetermined process which varies from task to task.

The selector SEL 1 employed in the ADU1 151 selects vertex data received from the DMAC (direct memory access controller) 142 or data stored temporarily in the local memory 143 and outputs the selected data to one of the SE to the SE 3 (the shader elements 110 to 113) or the rasterizer 131 by way of the ADU2 152. The data stored temporarily in the local memory 143 is typically the result of a filtering process carried out by the TU (texture unit) 121 performing a texture mapping process. This function is demanded when a texture is processed by making use of a fragment shader (FS) element while a vertex is being processed by making use of a vertex shader (VS) element at the same time. The ADU2 152 outputs the selected data to one of the SE 0 to the SE 3 (the shader elements 110 to 113) or the rasterizer 131 on the basis of a request made by any one of the SE 0 to the SE 3, dynamically changing the amount of data stored in a buffer employed in the ADU2 152.

The ADU2 152 controls the operation to receive data from the ADU1 151 as data to be output to one of the SE 0 to the SE 3 (the shader elements 110 to 113) or the rasterizer 131. The ADU2 152 employs three selectors, i.e., selectors SEL 2, SEL 3 and the SEL 4. The selector SEL 2 selects one of the SE 0 to the SE 3 (the shader elements 110 to 113) or the rasterizer 131 as a recipient of data output by the ADU2 152. The select function of the selector SEL 2 selects the rasterizer 131 in accordance with the set configuration information which varies from task to task. On the other hand, the selector SEL 3 selects the SE 0, the SE 1, the SE 2 or the SE 3 (the shader element 110, 111, 112 or 113). As described above, the data output by the ADU2 152 to the ADU1 151 is one of the pieces of data output by the SE 0 to the SE 3 (the shader elements 110 to 113) and it is the selector SEL 4 that selects one of the pieces of data as the data to be output to the ADU1 151.

Figure 15:
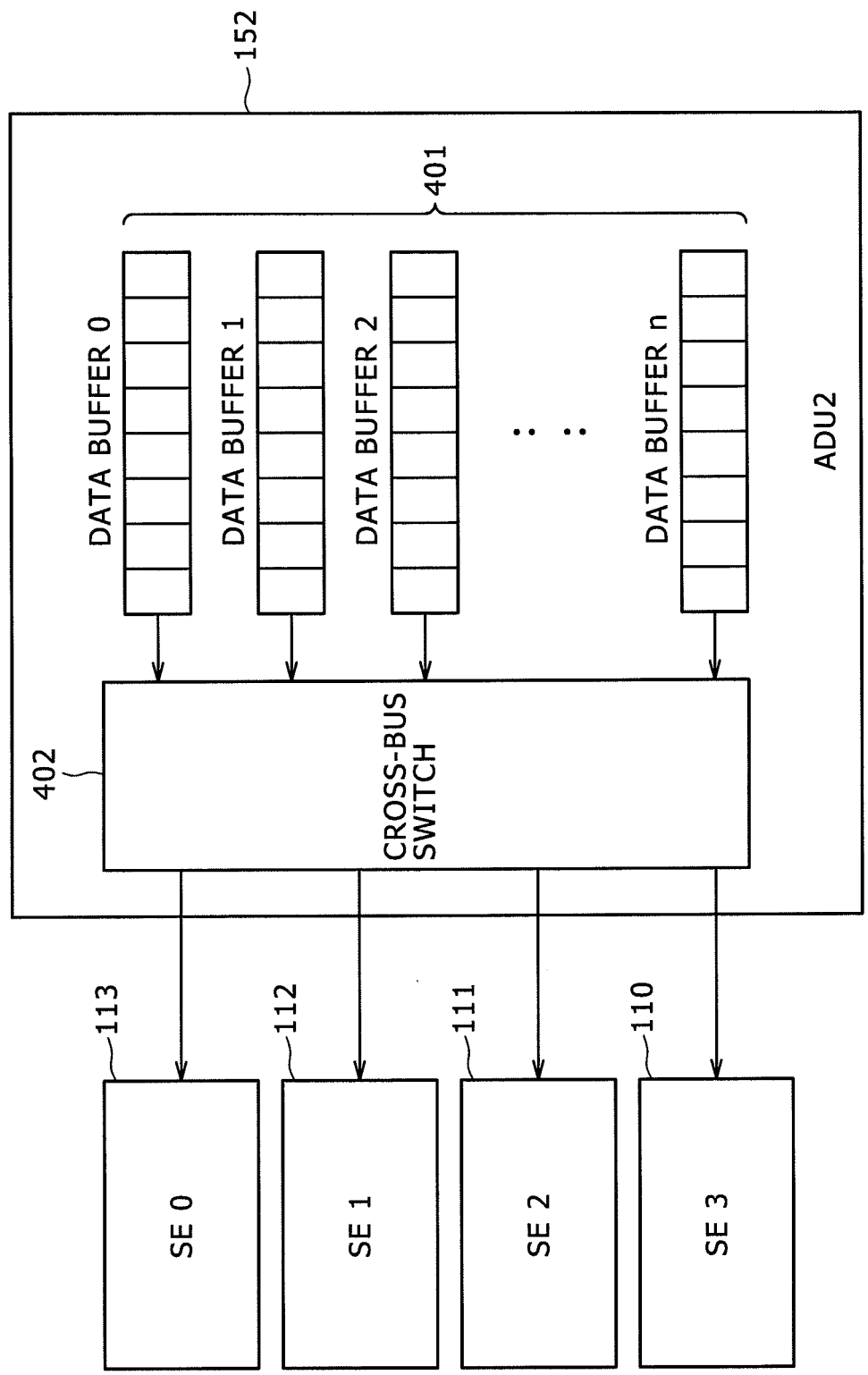
FIG. 15 is a block diagram showing a detailed configuration of a second sub-ADU (Arbitration Distribution Unit)

FIG. 15 is a block diagram showing a detailed configuration of the ADU2 152. As shown in FIG. 15, the ADU2 152 has a plurality of data buffers 401 used for storing vertex data received from the DMAC (direct memory access controller) 142 and data read out from the local memory 143. In addition, the ADU2 152 employs a cross-bus switch 402 for selectively designating one of the SE 0 to the SE 3 (the shader elements 110 to 113) as a shader element to receive data output by the ADU2 152. That is to say, the cross-bus switch 402 having a function for selectively designating one of the SE 0 to the SE 3 (the shader elements 110 to 113) as a shader element to receive data output by the ADU2 152 distributes the data to a plurality of SEs (shader elements), i.e., the SE 0 to the SE 3. The cross-bus switch 402 corresponds to the selectors SEL 2 and SE L 3 which are shown in FIG. 14. The data output by the ADU2 152 is data stored in a vertex memory or any one of the data buffers 401. The cross-bus switch 402 distributes the data to the SE 0 to the SE 3 (the shader elements 110 to 113) in accordance with configuration information set for the ADU2 152.

Figure 16:
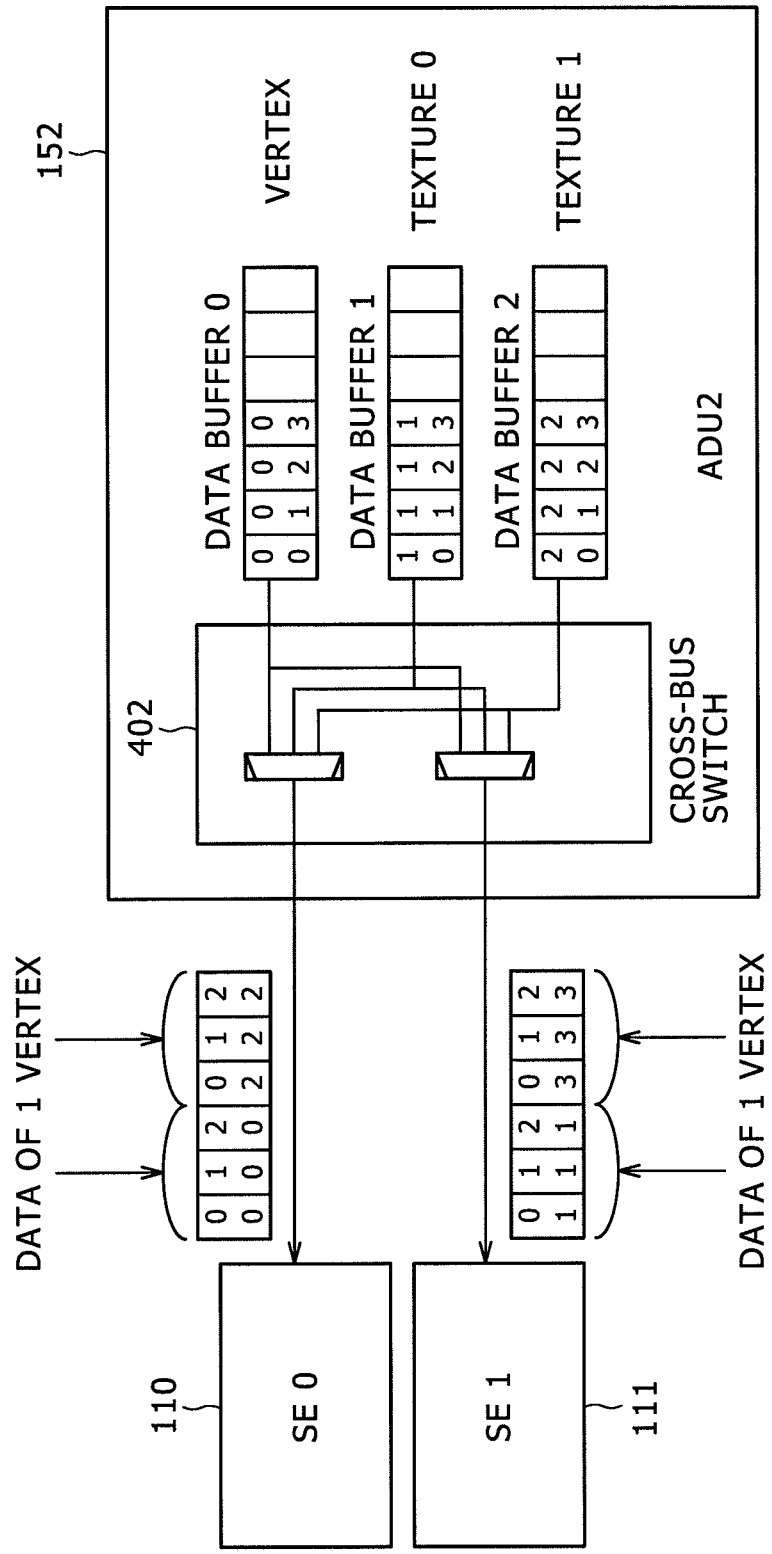
FIG. 16 is an explanatory diagram to be referred to in description of processing carried out by the second sub-ADU (Arbitration Distribution Unit) to control flows of data.
Figure 17:
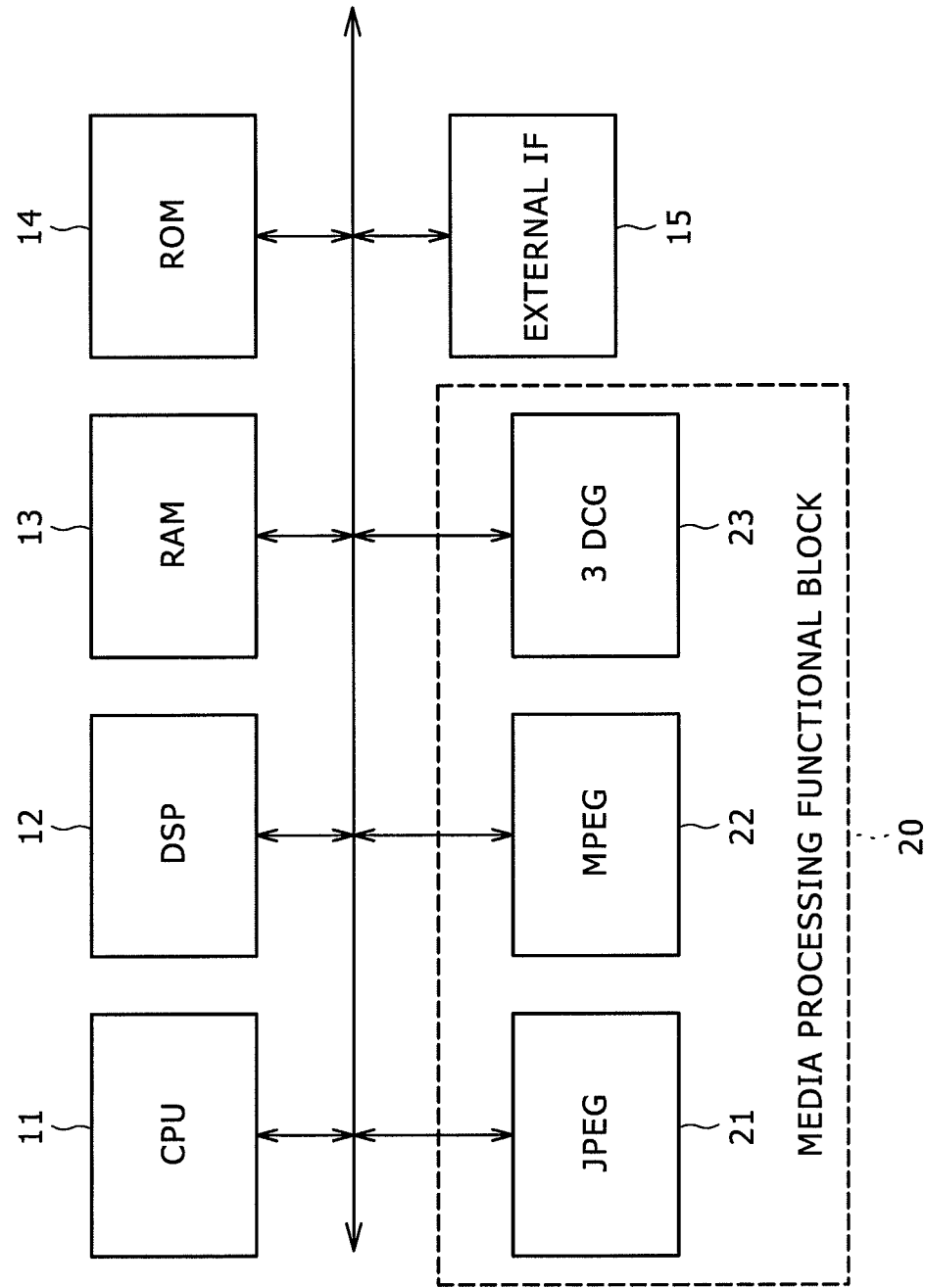
FIG. 17 is a block diagram showing an example of hardware for carrying out general 3DCG processing and general image CODEC processing.

For example, the SE 0 (the shader element 110) and the SE 1 (the shader element 111) have been set as a vertex shader (VS) element and three pieces of data (i.e. vertex data, the data of texture 0 and the data of texture 1) are each used as a processing unit of the SEs (shader elements) as shown in FIG. 16. In this case, three data buffers (i.e., data buffers 0, 1 and 2) employed in the ADU2 152 are used for storing the vertex data, the data of texture 0 and the data of texture 1 respectively. Units of the vertex data are 00, 01, 02 and 03 whereas units of the data of texture 0 are 10, 11, 12 and 13. Units of the data of texture 1 are 20, 21, 22 and 23. The cross-bus switch 402 employed in the ADU2 152 sequentially distributes the three pieces of data (i.e. the vertex data, the data of texture 0 and the data of texture 1) to the SE 0 to the SE 3 (the shader elements 110 to 113) as a data set in accordance with configuration information set for the ADU2 152.

The cross-bus switch 402 employed in the ADU2 152 shown in FIG. 16 sequentially distributes the three pieces of data (i.e. the vertex data, the data of texture 0 and the data of texture 1) to the SE 0 (the shader element 110) and the SE 1 (the shader element 111) by typically adopting a round robin method, that is, by typically selecting the recipient shader elements in the following order: SE 0→SE 1→SE 0→ and so on. If four shader elements are used, the cross-bus switch 402 sequentially distributes the three pieces of data (i.e. the vertex data, the data of texture 0 and the data of texture 1) to the SE 0 (the shader element 110), the SE 1 (the shader element 111), the SE 2 (the shader element 112) and the SE 3 (the shader element 113) by typically selecting the recipient shader elements in the following order: SE 0→SE 1→SE 2→SE 3→SE 0→SE 1 and so on.

As described above, data is supplied to the SE 0 to the SE 3 (the shader elements 110 to 113) in data processing units demanded by the SE 0 to the SE 3. In the reversed data flow through the selectors SEL 3 and the SE L 4 which are employed in the ADU2 152 as shown in FIG. 14, the selectors SEL 3 and the SE L 4 select one of the outputs of the SE 0 to the SE 3 (the shader elements 110 to 113) by adopting the round robin technique and supply the selected output to a data buffer.

The ADU3 153 shown in FIG. 14 controls an operation to select one of the outputs of the SE 0 to the SE 3 (the shader elements 110 to 113) or the output of the selector SEL 2 and supply the selected output to the rasterizer 131. The local memory 143 employs two selectors, i.e., selectors SEL 5 and the SE L 6. The selector SEL 5 selects the output of the selector SEL 6 or the output of the selector SEL 2 and supply the selected output to the rasterizer 131 in accordance with set configuration information which varies from task to task as is the case with the selector SEL 2. The selector SEL 6 selects one of the outputs of the SE 0 to the SE 3 (the shader elements 110 to 113). The outputs of the SE 0 to the SE 3 (the shader elements 110 to 113) and the output of the selector SEL 2 are the outputs of the ADU2 152 which receives data supplied by the local memory 143 or the DMAC (direct memory access controller) 142 by way of the ADU1 151.

Provided with a selector SEL 7, the ADU4 154 controls an operation to supply the fragment output of the rasterizer 131 to the SE 0 to the SE 3 (the shader elements 110 to 113). The selector SEL 7 selects one of the SE 0 to the SE 3 (the shader elements 110 to 113) each already set as a fragment shader (FS) as a recipient of the fragment output of the rasterizer 131 by adoption of the round robin method.

As described above, the ADU (arbitration distribution unit) 150 controls data transfers among configuration elements employed in the data processing section 100. The configuration elements employed in the data processing section 100 include the SE 0 to the SE 3 (the shader elements 110 to 113), the TU (texture unit) 121, the rasterizer 131, the PPU (pixel processing unit) 141, the DMAC (direct memory access controller) 142 and the local memory 143.

That is to say, the ADU (arbitration distribution unit) 150 dynamically executes control to change data transfer routes in the data processing section 100 in accordance with processing carried out by the data processing section 100. By executing the control, the data processing section 100 is capable of carrying out 3DCG processing and image CODEC processing conforming to a variety of standards such as JPEG, MPEG-2, MPEG-4 and MPEG-4AVC/H.264.

In particular, in the case of the information processing apparatus according to the present invention, by setting an active map included in the task list explained earlier by referring to FIG. 2, it is possible to specify data processing functional blocks used for carrying out a process and data processing functional blocks not used for carrying out the process.

In execution of image CODEC processing for example, neither the rasterizer 131 nor the PPU (pixel processing unit) 141 is used. In particular, in execution of a process to generate a contracted image, the SEs (shader elements) and the rasterizer 131 are not used. In addition, in a 3DCG process to draw an image, it is possible to provide a configuration in which the number of active SEs (shader elements) can be decreased if the load of the process is small.

The TC (task controller) 101 serving as a control section interprets an active map included in the task list and issues an instruction to an external clock supply controller to supply no clock signal to inactive data processing functional blocks or issues an instruction to a power-supply controller to supply no power to inactive data processing functional blocks. It is thus possible to execute power supplying control to provide neither clock signal nor power to data processing functional blocks each put in an inactive state because of function and/or load reasons. As a result, it is possible to stop an operation to wastefully supply power to deliberately selected inactive data processing functional blocks and, hence, reduce the power consumption.

The data processing section 100 according to the embodiment described above carries out a process as 3DCG or image CODEC processing. It is to be noted, however, that processes carried out by the data processing section 100 are by no means limited to the 3DCG processing and the image CODEC processing. For example, the data processing section 100 is also capable of carrying out processes such as a de-mosaic process for an input received from a CCD or CMOS image sensor and a camera signal process such as a noise filtering process. In addition, the data processing section 100 is also applicable to other kinds of data processing.

An embodiment of the present invention has been described so far by referring to diagrams. It is obvious, however, that a person skilled in the art is capable of thinking of any modifications of the embodiment or any substitutes for the embodiment as long as the modifications and the substitutes are within a range not deviating from essentials of the present invention. That is to say, the embodiment is merely a typical implementation of the present invention and, hence, should not be interpreted in a limited narrow manner. In order to determine the gist of the present invention, the reader is suggested to refer to claims included in this patent specification. It is to be noted that the data processing section 100 provided by the present invention is by no means limited to apparatus for carrying out the 3DCG processing and the image CODEC processing only. That is to say, the data processing section 100 provided by the present invention can also be applied to other kinds of data processing.

In addition, the series of processes explained in the patent specification can be carried out by using hardware, execution of software or adoption of a compound configuration making use of both. If the series of processes described above is carried out by execution of software, programs composing the software can be installed into a memory employed in a computer embedded in dedicated hardware, a general-purpose computer or the like from typically a network or a recording medium. In this case, the embedded computer or the general-purpose computer serves as the information processing apparatus described above. A general-purpose computer is a computer, which can be made capable of carrying out a variety of functions by installing a variety of programs into the memory of the computer. For example, the programs are recorded in advance in the recording medium which is then mounted on the computer in an operation to install the programs into the memory of the computer. Typically, the memory of the computer is a hard disk embedded in the computer. Instead of installing the program into the computer from a recording medium, the computer receives the programs from a network such as a LAN (Local Area Network) or the Internet and, then, the programs are installed into the hard disk employed in the computer.

It is also worth noting that, in this patent specification, the various processes described in this specification can each be carried out not only in a pre-prescribed order along the time axis, but also concurrently or individually depending on the processing power of the information processing apparatus or depending on necessity. It is also to be noted that the technical term 'system' used in this patent specification implies the configuration of a confluence including a plurality of apparatus.

As described above, there is provided an information processing apparatus characterized in that the apparatus employs: a plurality of data processing functional blocks each used for carrying out individual data processing; a flow control section for executing control of data flows among the data processing functional blocks; and a control section for carrying out a setting process to set the data processing functional blocks and the flow control section. The control section acquires configuration information in accordance with a task list for data processing to be carried out, carries out a setting process to set the data processing functional blocks and the flow control section on the basis of the acquired configuration information, and constructs a data processing configuration adapted to various kinds of data processing to be carried out. Thus, data processing functional blocks common to various kinds of data processing such as 3DCG processing and image CODEC processing can be used for carrying out the data processing. As a result, it is possible to implement an information processing apparatus allowing the area of an LSI implementing the data processing functional blocks, the manufacturing cost and the power consumption to be reduced.

In addition, it should be understood by those skilled in the art that a variety of modifications, combinations, sub-combinations and alterations may occur, depending on design requirements and other factors insofar as they are within the scope of the appended claims or the equivalents thereof.

What is claimed is:

1. An information processing apparatus for executing a 3-dimensional graphic process or an image CODEC process, the information processing apparatus comprising:
   a plurality of data processing functional blocks each used for executing an individual data processing included in a 3-dimensional graphic process or an image CODEC process, each of the plurality of data processing functional blocks being a hardware circuit;
   a flow control section configured to execute control of data flows among said data processing functional blocks; and
   a control section configured to execute a setting process to set said data processing functional blocks and said flow control section,
   wherein said control section:
      acquires configuration information in accordance with a task list for data processing to be executed;
      executes said setting process to set said data processing functional blocks and said flow control section on the basis of said acquired configuration information; and
      constructs a data processing configuration adapted to various kinds of data processing to be executed, wherein said task list includes an active map for holding data distinguishing data processing functional blocks used in data processing to be executed from data processing functional blocks not used in said data processing; and said control section executes control to stop an operation to supply power to said data processing functional blocks not used in data processing on the basis of said active map, and wherein the task list includes a plurality of tasks, and each task includes a plurality of passes prescribing a base address of data to be transferred from an external memory, a size of the data, and a synchronization mode.

2. The information processing apparatus according to claim 1 wherein said control section executes a process of setting at least some of said data processing functional blocks to be capable of performing different kinds or data processing to be executed in accordance with said data processing.

3. The information processing apparatus according to claim 1 wherein at least some of said data processing functional blocks are configured to function as data processing functional blocks for executing a variety of processes according to a received instruction and configured into a configuration capable of performing different kinds of data processing in conformity with said setting process executed by said control section.

4. The information processing apparatus according to claim 1 wherein at least some of said data processing functional blocks each have a configuration capable of selectively executing a vertex shader process or a fragment shader process.

5. The information processing apparatus according to claim 1 wherein:
at least some of said data processing functional blocks are each configured as one of a plurality of shader elements each capable of selectively executing a vertex shader process or a fragment shader process; and
said control section sets some of said shader elements to execute said vertex shader process and some of said shader elements to execute said fragment shader process.

6. The information processing apparatus according to claim 1 wherein:
at least some of said data processing functional blocks are each configured as one of a plurality of shader elements each capable of selectively executing a vertex shader process or a fragment shader process in; and
said control section executes control to set a time period for executing said vertex shader process and a time period for executing said fragment shader process, allocating said set time periods to some of said shader elements on a time division basis.

7. The information processing apparatus according to claim 1 wherein at least some of said data processing functional blocks each have a configuration capable of selectively executing a vertex shader process or a fragment shader process or a macro-block process.

8. The information processing apparatus according to claim 1 wherein:
at least some of said data processing functional blocks are each a texture unit for executing a texture process; and
said texture unit has a configuration for executing a process to generate a contracted image and, in order to generate a final contracted image having a desired size, repeatedly executing the following steps of:
outputting a contracted image obtained as a result of said process to an external destination by way of a local memory;
reacquiring said contracted image from said local memory; and
shrinking said reacquired contracted image.

9. The information processing apparatus according to claim 1 wherein said flow control section comprises:
a data buffer for temporarily storing data; and
a cross-bus switch for selectively outputting data stored in said data buffer to the plurality of data processing functional blocks.

10. The information processing apparatus according to claim 1 wherein said flow control section has a configuration for executing a process to sequentially changing an output destination of data from one to another in accordance with said data to be output.

11. The information processing apparatus according to claim 1 wherein said flow control section has a configuration for executing a process to sequentially changing an output destination of data from one to another by adoption of a round-robin technique in accordance with said data to be output data.

12. An information processing method of an information processing apparatus for executing a 3-dimensional graphic process or an image CODEC process, the information processing method comprising:
a plurality of data processing functional steps each used for executing an individual data process included in a 3-dimensional graphic process or an image CODEC process, the plurality of data processing functional steps being executed by a hardware circuit;
a flow control step configured to execute control of data flows among said data processing functional steps; and
a control section configured to execute a setting process to set said data processing functional blocks and said flow control section, wherein
said control step further including:
acquiring configuration information in accordance with a task list for data processing to be executed;
executing a setting process to set said data processing functional steps and said flow control step on the basis of said acquired configuration information; and
constructing a data processing configuration adapted to said data processing to be executed,
wherein said task list includes an active map for holding data distinguishing data processing functional steps used in data processing to be executed from data processing functional steps not used in said data processing; and said control step executes control to stop an operation to supply power to said data processing functional steps not used in data processing on the basis of said active map, and
wherein the task list includes a plurality of tasks, and each task includes a plurality of passes prescribing a base address of data to be transferred from an external memory, a size of the data, and a synchronization mode.

13. The information processing method according to claim 12 whereby said control step executes a process of setting at least some of said data processing functional steps to be capable of performing different kinds of data processing to be executed in accordance with said data processing.

14. The information processing method according to claim 12 wherein:
at least some of said data processing functional steps are configured to function as data processing functional steps for executing a variety of processes according to a received instruction; and said control step controls an operation to configure at least some of said data processing functional steps to execute specific data processing in accordance with setting based on said task list.

15. The information processing method according to claim 12 wherein at least some of said data processing functional steps each have a configuration capable of selectively executing a vertex shader process or a fragment shader process.

16. The information processing method according to claim 12 wherein:
at least some of said data processing functional steps are each configured as one of a plurality of shader elements each capable of selectively executing a vertex shader process or a fragment shader process; and
said control step sets some of said shader elements to execute said vertex shader process and some of said shader elements to execute said fragment shader process.

17. The information processing method according to claim 12 wherein:
at least some of said data processing functional steps are each configured as one of a plurality of shader elements each capable of selectively executing a vertex shader process or a fragment shader process; and
said control step executes control to set a time period for executing said vertex shader process and a time period for executing said fragment shader process, allocating said set time periods to some of said shader elements on a time division basis.

18. The information processing method according to claim 12 wherein at least some of said data processing functional steps each have a configuration capable of selectively executing a vertex shader process or a fragment shader process or a macro-block process.

19. The information processing method according to claim 12 wherein:
at least some of said data processing functional steps are each a texture step for executing a texture process; and
said texture step executes a process to generate a contracted image and, in order to generate a final contracted image having a desired size, repeatedly executes the following steps of:
outputting a contracted image obtained as a result of said process to an external destination by way of a local memory;
reacquiring said contracted image from said local memory; and
shrinking said reacquired contracted image.

20. The information processing method according to claim 12 wherein said flow control step comprises:
a data buffer step for temporarily storing data; and
a cross-bus switching step for selectively outputting data stored in said data buffer step to the plurality of data processing functional steps.

21. The information processing method according to claim 12 wherein said flow control step executes a process to sequentially changing an output destination of data from one to another in accordance with said data to be output.

22. The information processing method according to claim 12 wherein said flow control step executes a process to sequentially changing an output destination of data from one to another by adoption of a round-robin technique in accordance with said data to be output data.

23. A non-transitory storage medium storing a computer program to be executed to drive an information processing apparatus for executing a 3-dimensional graphic process or an image CODEC process, the computer program comprising:
a plurality of data processing functional steps each used for executing an individual block process included in a 3-dimensional graphic process or an image CODEC process, the plurality of data processing functional steps being executed by a hardware circuit;
a flow control step configured to execute control of data flows among said data processing functional steps; and
a control step configured to execute a process to set said data processing functional steps and said flow control step,
wherein said control step further includes:
acquiring configuration information in accordance with a task list for data processing to be executed;
executing a setting process to set said data processing functional steps and said flow control step on the basis of said acquired configuration information; and
constructing a data processing configuration adapted to said data processing to be executed,
wherein said task list includes an active map for holding data distinguishing data processing functional steps used in data processing to be executed from data processing functional steps not used in said data processing; and said control step executes control to stop an operation to supply power to said data processing functional steps not used in data processing on the basis of said active map, and
wherein the task list includes a plurality of tasks, and each task includes a plurality of passes prescribing a base address of data to be transferred from an external memory, a size of the data, and a synchronization mode.

* * * * *